United States Patent
Shiga et al.

(10) Patent No.: US 10,730,988 B2
(45) Date of Patent: Aug. 4, 2020

(54) MODIFIED POLYOLEFIN PARTICLES AND METHODS FOR PRODUCING THE SAME

(71) Applicant: MITSUI CHEMICALS, INC., Tokyo (JP)

(72) Inventors: Ryohei Shiga, Ichihara (JP); Keiichi Ikeda, Sodegaura (JP); Kazuto Sugiyama, Ichihara (JP); Takeharu Isaki, Chiba (JP); Masayoshi Aoki, Sodegaura (JP)

(73) Assignee: MITSUI CHEMICALS, INC., Tokyo (JP)

(*) Notice: Subject to any disclaimer, the term of this patent is extended or adjusted under 35 U.S.C. 154(b) by 6 days.

(21) Appl. No.: 15/509,750

(22) PCT Filed: Sep. 11, 2015

(86) PCT No.: PCT/JP2015/075920
§ 371 (c)(1),
(2) Date: Mar. 8, 2017

(87) PCT Pub. No.: WO2016/039461
PCT Pub. Date: Mar. 17, 2016

(65) Prior Publication Data
US 2017/0283539 A1    Oct. 5, 2017

(30) Foreign Application Priority Data
Sep. 12, 2014    (JP) ................................ 2014-186135

(51) Int. Cl.
C08F 255/00    (2006.01)
C08F 255/02    (2006.01)
C08F 255/04    (2006.01)
C08F 255/08    (2006.01)

(52) U.S. Cl.
CPC .......... C08F 255/08 (2013.01); C08F 255/02 (2013.01); C08F 255/04 (2013.01)

(58) Field of Classification Search
CPC ..... C08F 255/02; C08F 255/04; C08F 255/08
See application file for complete search history.

(56) References Cited

U.S. PATENT DOCUMENTS

| 4,501,827 A | 2/1985 | Nagano et al. |
| 4,536,545 A | 8/1985 | Olener et al. |
| 2005/0288447 A1 | 12/2005 | Onishi et al. |
| 2009/0068483 A1 | 3/2009 | Morikawa et al. |
| 2011/0003942 A1 | 1/2011 | Tsukui et al. |
| 2016/0355628 A1 | 12/2016 | Yoshimoto et al. |

FOREIGN PATENT DOCUMENTS

| CN | 1444609 | 9/2003 |
| CN | 1823103 | 8/2006 |
| CN | 101700702 | 5/2010 |
| EP | 3 109 264 A1 | 12/2016 |
| JP | S59-120644 A | 7/1984 |
| JP | H0517585 | 1/1993 |
| JP | H07-118488 A | 5/1995 |
| JP | H10-007704 A | 1/1998 |
| JP | 2000-345098 A | 12/2000 |
| JP | 2004-099737 A | 4/2004 |
| JP | 2006-219627 A | 8/2006 |
| JP | 2006-328388 A | 12/2006 |
| JP | 2007-126561 A | 5/2007 |
| JP | 2008-163289 A | 7/2008 |
| JP | 2009-040975 A | 2/2009 |
| JP | 2009-227974 A | 10/2009 |
| JP | 2010-018750 A | 1/2010 |
| JP | 2013-155326 A | 8/2013 |
| WO | WO2009/022646 | 2/2009 |
| WO | WO-2010-119480 A1 | 10/2010 |

OTHER PUBLICATIONS

Machine translation of JP2000-345098 downloaded Sep. 10, 2018.*
JP2006219627 machine translation downloaded Sep. 3, 2019.*
Extended European Search Report dated Mar. 29, 2018 in corresponding application No. 15840012.7.
Chinese Office Action regarding Application No. 201580048846.5; 10 pages.
Japanese Patent Office, "Notice of Reasons for Refusal," issued in connection with Japanese Patent Application No. 2016-547807, dated Aug. 6, 2019.
Office Action dated Mar. 24, 2020 for corresponding Japanese Patent Application No. 2016-547807.

* cited by examiner

*Primary Examiner* — Irina S Zemel
*Assistant Examiner* — Jeffrey S Lenihan
(74) *Attorney, Agent, or Firm* — Foley & Lardner LLP

(57) ABSTRACT

Modified polyolefin particles are obtained by grafting a monomer having an ethylenically unsaturated group and a polar functional group in the same molecule to a polymer including one, or two or more specific α-olefins and having a specific melting point, the modified polyolefin particles satisfying the following requirements (1) to (3): (1) the amount of grafting x by the monomer is not less than 0.5 wt % and not more than 20 wt %; (2) the x (wt %) and the intrinsic viscosity [η] (dl/g) measured in decalin at 135° C. satisfy the relation: $\log_{10}[\eta] \geq 0.1 - 0.15x$; and (3) the particles have a gel content of less than 1 wt %.

24 Claims, 1 Drawing Sheet

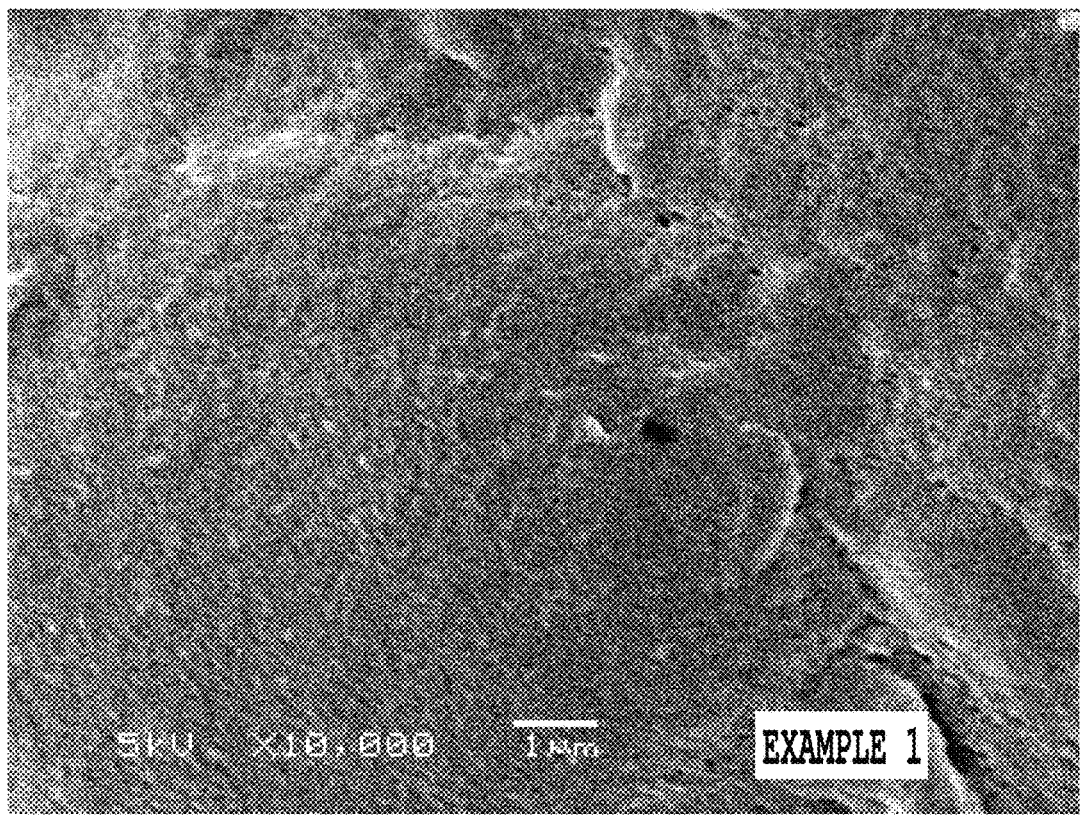

MODIFIED POLYOLEFIN PARTICLES AND METHODS FOR PRODUCING THE SAME

CROSS-REFERENCE TO RELATED APPLICATIONS

The present application is a U.S. national stage application of International Patent Application No. PCT/JP2015/075920, filed Sep. 11, 2015, which claims the benefit of priority to Japanese Patent Application No. 2014-186135, filed Sep. 12, 2014, the entireties of which are hereby incorporated by reference.

TECHNICAL FIELD

The present invention relates to modified polyolefin particles and methods for producing the same.

BACKGROUND ART

Polyolefin resins have many excellent properties such as chemical resistance and mechanical characteristics but have a drawback in that the polymers, because of being non-polar, exhibit low affinity for polar substances. A conventional approach that is used to overcome this drawback is to modify polyolefins by grafting polar groups derived from, for example, organic carboxylic acids with a carbon-carbon double bond to the polyolefins using organic peroxides as initiators.

Some example methods that have been adopted for such polyolefin modifications are one in which a modifier is added to a polyolefin and the polyolefin is modified by being extruded in a molten state at high temperature under high shear with use of a device such as an extruder (the melt method), and one in which a polyolefin is dissolved in a solvent and a modifier is added to the resulting solution to modify the polyolefin (the solution method).

In the melt method, polyolefins, in particular, those containing tertiary carbon atoms such as polypropylene, polybutene and polymethylpentene, are prone to be decomposed at the tertiary carbon atoms. Because the modification with a modifier such as an organic carboxylic acid having a carbon-carbon bond is a grafting reaction, the decomposition reaction occurs more markedly when a large amount of grafting is to be introduced into the polyolefin. Thus, the melt method encounters a difficulty in satisfying both the amount of grafting and the molecular weight.

In principle, the solution method can suppress the decomposition reaction by setting the reaction temperature to below the level used in the melt method. However, the solution viscosity is generally so increased under such low reaction temperature conditions that problems such as difficult stirring are caused. Thus, it is difficult to satisfy both the amount of grafting and the molecular weight even by the solution method.

Among studies on the satisfaction of both of the amount of grafting and the molecular weight, for example, JP-A-2006-328388 (Patent Document 2) discloses a method in which an isotactic polypropylene, an organic acid component, and a peroxide including a peroxycarbonate structure are mixed together in an organic solvent while performing heating so as to give an acid-modified polypropylene. However, polymers modified by this method cannot attain sufficient strength when formed into composites with carbon fibers, glass fibers, cellulose fibers, plant fibers or the like. Thus, the balance between the amount of grafting and the molecular weight is still to be improved.

Another known method for further enhancing the balance between the amount of grafting and the molecular weight is the solid phase method in which a polyolefin polymer is modified at a temperature that is less than the melting point of the polymer. The solid phase method is advantageous in that the modification reaction does not involve a shear force to the molecular chains associated with stirring and consequently the breakage of molecular chains by shearing is avoided and the decrease in molecular weight can be correspondingly reduced.

One of the problems of these known modification methods, in particular, the solid phase method, is that the grafting reaction occurs locally and the product tends to have a nonuniform quality and to contain gel. Another problem is that depending on the type of a polyolefin to be modified, the grafting reaction is accompanied by crosslinking reaction at times. Gelation by the crosslinking reaction or the like of modified polyolefins obtained by the known methods results in problems such as fish eyes in films. Further, composites of such polymers with carbon fibers, glass fibers, cellulose fibers, plant fibers or the like exhibit poor strength.

Regarding the solution method, some studies focus on solvents used for the modification reaction and attempt to solve the above-described problems by using a solvent cleaned of specific impurities. For example, JP-A-2010-18750 (Patent Document 1) discloses a method for producing an unsaturated carboxylic acid-grafted polyolefin with low gel content and little coloration. In the disclosed method, an unsaturated carboxylic acid is grafted to a polyolefin in purified 1,1,2-trichloroethane as a solvent that has been cleaned of alcohol compounds and/or epoxy compounds, at a reaction temperature of 40 to 130° C. and a reaction pressure of not more than 1 MPa. Patent Document 1 also discloses that an unsaturated carboxylic acid-grafted polyolefin obtained by such a production method contains a gel that is insoluble in 140° C. xylene but the content of such a gel is as low as less than 0.02 wt %, and further discloses that the amount of grafting by the unsaturated carboxylic acid is 0.1 to 10 wt %.

CITATION LIST

Patent Literature

Patent Document 1: JP-A-2010-18750
Patent Document 2: JP-A-2006-328388

SUMMARY OF INVENTION

Technical Problem

The method described in Patent Document 1 is the solution method and, as mentioned hereinabove, has a room for improvement in the balance between the amount of grafting and the molecular weight. Further, the method involves an additional purification step to remove alcohol compounds and/or epoxy compounds, which are impurities in 1,1,2-trichloroethane, from 1,1,2-trichloroethane used as the solvent prior to the grafting reaction, which is not preferable from an economic viewpoint. Furthermore, particles that are obtained generally have a particle size of 0.1 mm or less and will exhibit poor handleability and workability when shaped or mixed with various resins.

It is therefore an object of the present invention to provide modified polyolefin particles which have a satisfactory amount of grafting and a sufficient molecular weight, are substantially free from gels, and exhibit excellent handleability and workability when shaped or mixed with various resins.

Solution to Problem

The present inventors carried out extensive studies in light of the circumstances discussed above, and have completed the present invention as a result.

Specifically, the present invention pertains to the following [1] to [25].

[1] Modified polyolefin particles obtained by grafting a monomer having an ethylenically unsaturated group and a polar functional group in the same molecule to a polymer including one, or two or more α-olefins selected from $C_{2-18}$ α-olefins and having a melting point of not less than 50° C. and less than 250° C., the modified polyolefin particles satisfying the following requirements (1) to (3):

(1) The amount of grafting x by the monomer having an ethylenically unsaturated group and a polar functional group in the same molecule is not less than 0.5 wt % and not more than 20 wt %.

(2) The amount of grafting x (wt %) by the monomer having an ethylenically unsaturated group and a polar functional group in the same molecule, and the intrinsic viscosity [η](dl/g) measured in decalin at 135° C. satisfy the relation:

$\log_{10}[\eta] \geq 0.1 - 0.15x$.

(3) The modified polyolefin particles have a gel content of less than 1 wt %.

Here, the gel content is determined by placing approximately 0.3 g of the modified polyolefin particles into a 330 mesh metal gauge, adding 100 ml of xylene to the modified polyolefin particles in the gauge, heating the mixture under reflux for 2 hours, and calculating a ratio of the weight of undissolved components retained in the metal gauge to the weight of the whole of the modified polyolefin particles, and is obtained as the ratio.

[2] A method for producing the modified polyolefin particles described in [1], including:

impregnating particles of a polymer including one, or two or more α-olefins selected from $C_{2-18}$ α-olefins and having a melting point (Tm) of not less than 50° C. and less than 250° C. with a solution including:

(a) a monomer having an ethylenically unsaturated group and a polar functional group in the same molecule, (b) an organic peroxide and (c) an organic solvent, and reacting the particles with the solution at a temperature lower than (Tm−10)° C., the value of (number of moles of (a)÷number of moles of (b)) being 1 to 20.

[3] The method described in [2], wherein the polymer described in [2] is a propylene homopolymer, and the value of (number of moles of (a)÷number of moles of (b)) is 1.5 to 10.

[4] The method described in [2], wherein the polymer described in [2] is a random copolymer based on propylene, and the value of (number of moles of (a)÷number of moles of (b)) is 3 to 10.

[5] The method described in [4], wherein the content of propylene in the random copolymer is not less than 70 mol % and less than 99.9 mol %.

[6] The method described in [5], wherein the random copolymer is a random copolymer including at least one comonomer selected from ethylene and butene.

[7] The method described in [2], wherein the polymer described in [2] is a random copolymer or homopolymer based on 4-methylpentene-1, and the value of (number of moles of (a)÷number of moles of (b)) is 4 to 15.

[8] The method described in [7], wherein the content of 4-methylpentene-1 in the random copolymer or the homopolymer is not less than 80 mol %.

[9] The modified polyolefin particles described in [1], having an average particle size of 0.2 mm to 10 mm.

[10] The modified polyolefin particles described in [1], having an average particle size of 0.2 mm to 2.5 mm.

[11] The modified polyolefin particles described in [1], wherein the gel content is not less than 0.00003 wt %.

[12] The modified polyolefin particles described in [11], wherein the polymer is a polymer of an α-olefin except a propylene homopolymer, and the gel content is not less than 0.00003 wt %.

[13] The modified polyolefin particles described in [10], wherein the surface of the particles, when observed on a scanning electron microscope with 10000 times magnification, has a 1 μm×1 μm region containing 5 to 400 holes having a size of 0.05 μm to 0.2 μm.

[14] The modified polyolefin particles described in [13], wherein when the surface of the particles is observed on a scanning electron microscope with 10000 times magnification with respect to randomly selected three portions of the surface in a 13 μm×10 μm field of view, one, or two or more of the three portions of the particle surface have a 1 μm×1 μm region containing 10 to 400 holes having a size of 0.05 μm to 0.2 μm.

[15] The modified polyolefin particles described in any of [1] and [9] to [14], wherein the modified polyolefin particles, when heated at 190° C. for 30 minutes, generate a gas containing an aliphatic alcohol with 150 or less molecular weight in an amount of not less than 1 μg and not more than 10000 μg per 1 g of the modified polyolefin particles as measured by headspace gas chromatography.

[16] The modified polyolefin particles described in [15], wherein in the gas generated by heating the modified polyolefin particles at 190° C. for 30 minutes, the content, measured by headspace gas chromatography, of an aliphatic alcohol with 110 or less molecular weight is not less than 1 μg and not more than 10000 μg per 1 g of the modified polyolefin particles.

[17] The modified polyolefin particles described in any of [1] and [9] to [14], wherein the modified polyolefin particles, when heated at 190° C. for 30 minutes, generate a gas containing an aliphatic alcohol with 150 or less molecular weight and an aromatic ring-containing compound with 250 or less molecular weight each in an amount of not less than 1 μg and not more than 10000 μg per 1 g of the modified polyolefin particles as measured by headspace gas chromatography.

[18] The modified polyolefin particles described in any of [1], [9] to [14] and [16], wherein the grafting is performed by graft reacting the monomer having an ethylenically unsaturated group and a polar functional group in the same molecule to the polyolefin resin in the presence of a radical initiator, and the radical initiator is an organic peroxide including an aliphatic alkoxy radical moiety with 150 or less molecular weight as a constituent moiety of the peroxide.

[19] The modified polyolefin particles described in [18], wherein the molecular weight of the aliphatic alkoxy radical moiety is not more than 110.

[20] The modified polyolefin particles described in any of [1], [9] to [14] and [17], wherein the grafting is performed by graft reacting the monomer having an ethylenically unsaturated group and a polar functional group in the same molecule to the polyolefin resin in the presence of a radical initiator, and the radical initiator is an organic peroxide including an aliphatic alkoxy radical moiety with 150 or less molecular weight and an aromatic ring-containing compound radical moiety with 250 or less molecular weight as constituent moieties of the peroxide.

[21] The method described in [2], wherein the particles of the polymer have an average particle size of 0.2 mm to 10 mm.

[22] The method described in [2], wherein the particles of the polymer have an average particle size of is 0.2 mm to 2.5 mm.

[23] The method described in any of [2], [21] and [22], wherein the organic peroxide is an organic peroxide including an aliphatic alkoxy radical moiety with 150 or less molecular weight as a constituent moiety of the peroxide.

[24] The method described in [23], wherein the molecular weight of the aliphatic alkoxy radical moiety is not more than 110.

[25] The method described in any of [2], [21] and [22], wherein the organic peroxide is an organic peroxide including an aliphatic alkoxy radical moiety with 150 or less molecular weight and an aromatic ring-containing compound radical moiety with 250 or less molecular weight as constituent moieties of the peroxide.

Advantageous Effects of Invention

According to the present invention, modified polyolefin particles having a low gel content and an appropriate particle size can be obtained. The particles exhibit excellent handleability and workability when shaped or mixed with various resins, and are expected to overcome problems such as the occurrence of fish eyes when the particles are formed into films.

BRIEF DESCRIPTION OF DRAWING

The FIGURE is a scanning electron microscope image of the surface of a maleic anhydride-modified polypropylene particle obtained in Example 1.

DESCRIPTION OF EMBODIMENTS

Hereinbelow, the present invention will be described in detail.
(Modified Polyolefin Particles)

Particles according to the present invention include a modified polyolefin obtained by grafting a monomer having an ethylenically unsaturated group and a polar functional group in the same molecule to a polymer which includes one, or two or more α-olefins selected from $C_{2-18}$ α-olefins and which has a melting point of not less than 50° C. and less than 250° C. The modified polyolefin particles satisfy the following requirements (1) to (3):

(1) The amount of grafting by the monomer having an ethylenically unsaturated group and a polar functional group in the same molecule is not less than 0.5 wt %.

(2) The amount of grafting x (wt %) by the monomer having an ethylenically unsaturated group and a polar functional group in the same molecule, and the intrinsic viscosity [η](dl/g) measured in decalin at 135° C. satisfy the relation:

$\log_{10}[\eta] \geq 0.1 - 0.15x$.

(3) The modified polyolefin particles have a gel content of less than 1 wt %.

Polymers (Polyolefin Resins) Including One, or Two or More α-Olefins Selected from $C_{2-18}$ α-Olefins and Having Melting Point of not Less than 50° C. and Less than 250° C.

The polymer used in the invention as the base polymer that constitutes modified polyolefin particles is one which includes one, or two or more α-olefins selected from $C_{2-18}$ α-olefins and which has a melting point of not less than 50° C. and less than 250° C. In an exemplary embodiment of the invention, a polymer suitably used is one which has a melting point of not less than 50° C. and less than 240° C. This preference, however, does not eliminate the use of a polymer with a melting point of 240° C. or above in the invention as the polymer whose melting point is not less than 50° C. and less than 250° C.

Examples of the polymers in the invention which include one, or two or more α-olefins selected from $C_{2-18}$ α-olefins and which have a melting point of not less than 50° C. and less than 250° C. include homopolymers and copolymers of such α-olefins as ethylene, propylene, butene-1, pentene-1, 2-methylbutene-1, 3-methylbutene-1, hexene-1, 3-methylpentene-1, 4-methylpentene-1, 3,3-dimethylbutene-1, heptene-1, methylhexene-1, dimethylpentene-1, trimethylbutene-1, ethylpentene-1, octene-1, methylpentene-1, dimethylhexene-1, trimethylpentene-1, ethylhexene-1, methylethylpentene-1, diethylbutene-1, propylpentene-1, decene-1, methylnonene-1, dimethyloctene-1, trimethylheptene-1, ethyloctene-1, methylethylheptene-1, diethylhexene-1, octadecene-1, dodecene-1 and hexadodecene-1.

Of these, preferred polymers, among others, are:
polymers based on ethylene, polymers based on propylene, polymers based on butene, and polymers based on 4-methylpentene-1.

Particularly preferred polymers, among others, are:
propylene homopolymer, propylene.ethylene random copolymer, propylene.butene random copolymer, propylene.ethylene.butene random copolymer, butene homopolymer, butene.ethylene random copolymer, butene.propylene random copolymer, butene.ethylene.propylene random copolymer, 4-methylpentene-1 homopolymer, random copolymer of 4-methylpentene-1 and propylene, random copolymer of 4-methylpentene-1 and hexene-1, random copolymer of 4-methylpentene-1 and decene-1, random copolymer of 4-methylpentene-1 and tetradecene, random copolymer of 4-methylpentene-1 and hexadecene-1, random copolymer of 4-methylpentene-1 and octadecene-1, and random copolymer of 4-methylpentene-1, hexadecene-1 and octadecene-1.

Of these, from the point of view of the balance between heat resistance and mechanical characteristics, polymers based on propylene and copolymers based on 4-methylpentene-1 are preferable, and propylene homopolymer, propylene.ethylene random copolymer, propylene.butene-1 random copolymer, and random copolymer of 4-methylpentene-1 and decene-1 are particularly preferable.

In a random copolymer based on propylene, for example, propylene.ethylene random copolymer, the propylene content is not less than 70 mol % and less than 99.9 mol %, preferably not less than 80 mol % and less than 99.5 mol %, and more preferably not less than 90 mol % and less than 99 mol %.

In a random copolymer or homopolymer based on 4-methylpentene-1, the content of 4-methylpentene-1 is not less than 80 mol %, preferably not less than 85 mol % and less than 99.5 mol %, and more preferably not less than 90 mol % and less than 99 mol %.

Hereinafter in the specification, the polymers including one, or two or more α-olefins selected from $C_{2-18}$ α-olefins and having a melting point of not less than 50° C. and less than 250° C. will be also written as the "polyolefin resins" or simply the "polyolefins". Further, particles including the polymer will be sometimes written simply as the "polyolefin particles".

The modified polyolefin particles of the invention may contain any known additional materials besides the polyolefin resin as long as the properties which are characteristic of the particles are not altered. In this case, the amount of such known materials is usually not more than 20 wt %, and preferably not more than 10 wt % relative to the polyolefin resin. In a usual embodiment, the modified polyolefin particles of the invention are composed solely of the polyolefin resin.

In the specification, the term "polymers" is sometimes used as the simple and generic concept meaning homopolymers and copolymers.

Monomers Having Ethylenically Unsaturated Group and Polar Functional Group in the Same Molecule The modified polyolefin particles of the invention include a monomer having an ethylenically unsaturated group and a polar functional group in the same molecule, and this monomer is present as grafts to the polyolefin resin. Specifically, the modified polyolefin particles of the invention have a structure in which repeating units derived from a monomer having an ethylenically unsaturated group and a polar functional group in the same molecule, are introduced to the polyolefin chains that form the polyolefin resin.

Examples of the monomers having an ethylenically unsaturated group and a polar functional group in the same molecule which can be grafted in the modified polyolefin particles of the invention include hydroxyl group-containing ethylenically unsaturated compounds, amino group-containing ethylenically unsaturated compounds, epoxy group-containing ethylenically unsaturated compounds, nitrogen-containing aromatic vinyl compounds, lactam structure-containing ethylenically unsaturated compounds, unsaturated carboxylic acids and derivatives thereof, vinyl ester compounds, nitrile group-containing unsaturated compounds, vinyl chloride, and vinyl silane compounds. These monomers may be used singly, or two or more may be used in combination.

Of the above monomers, specific examples of the hydroxyl group-containing ethylenically unsaturated compounds include (meth)acrylate esters such as hydroxyethyl (meth)acrylate, 2-hydroxypropyl (meth)acrylate, 3-hydroxypropyl (meth)acrylate, 2-hydroxy-3-phenoxy-propyl (meth)acrylate, 3-chloro-2-hydroxypropyl (meth)acrylate, glycerol mono(meth)acrylate, pentaerythritol mono(meth)acrylate, trimethylolpropane mono(meth)acrylate, tetramethylolethane mono(meth)acrylate, butanediol mono(meth)acrylate, polyethylene glycol mono(meth)acrylate and 2-(6-hydroxyhexanoyloxy)ethyl acrylate; 10-undecen-1-ol, 1-octen-3-ol, 2-methanolnorbornene, hydroxystyrene, hydroxyethyl vinyl ether, hydroxybutyl vinyl ether, N-methylolacrylamide, 2-(meth)acryloyloxyethyl acid phosphate, glycerol monoallyl ether, allyl alcohol, allyloxyethanol, 2-butene-1,4-diol and glycerol monoalcohol. Of these, hydroxyethyl (meth)acrylate and 2-hydroxypropyl (meth)acrylate are preferable.

The amino group-containing ethylenically unsaturated compounds are compounds having an ethylenic double bond and an amino group. Examples of such compounds include vinyl monomers which have at least one amino group or substituted amino group represented by the following formula.

[Chem. 1]

In the above formula, $R^6$ is a hydrogen atom, a methyl group or an ethyl group, and $R^7$ is a hydrogen atom, an alkyl group having 1 to 12, or preferably 1 to 8 carbon atoms, or a cycloalkyl group having 6 to 12, or preferably 6 to 8 carbon atoms. The alkyl group or the cycloalkyl group may further have a substituent.

Specific examples of such amino group-containing ethylenically unsaturated compounds include alkyl acrylate or methacrylate ester derivatives such as aminoethyl (meth)acrylate, propylaminoethyl (meth)acrylate, 2-(dimethylamino)ethyl methacrylate, aminopropyl (meth)acrylate, phenylaminoethyl methacrylate and cyclohexylaminoethyl methacrylate; vinylamine derivatives such as N-vinyldiethylamine and N-acetylvinylamine; allylamine derivatives such as allylamine, methacrylamine and N-methyl(meth)acrylamine; acrylamide derivatives such as (meth)acrylamide, N-methyl(meth)acrylamide, N,N-dimethyl(meth)acrylamide and N,N-dimethylaminopropyl(meth)acrylamide; aminostyrenes such as p-aminostyrene; 6-aminohexylsuccinimide and 2-aminoethylsuccinimide. Of these, aminoethyl (meth)acrylate, propylaminoethyl (meth)acrylate, (meth)acrylamide and N,N-dimethyl(meth)acrylamide are preferable.

The epoxy group-containing ethylenically unsaturated compounds are monomers having a polymerizable unsaturated bond and at least one or more epoxy groups in the molecule. Specific examples of such epoxy group-containing ethylenically unsaturated compounds include glycidyl acrylate, glycidyl methacrylate, mono- and diglycidyl esters of maleic acid, mono- and diglycidyl esters of fumaric acid, glycidyl ester of crotonic acid, mono- and diglycidyl esters of tetrahydrophthalic acid, mono- and glycidyl esters of itaconic acid, mono-, di- and triglycidyl esters of butenetricarboxylic acid, mono- and diglycidyl esters of citraconic acid, mono- and diglycidyl esters of endo-cis-bicyclo[2.2.1]hept-5-ene-2,3-dicarboxylic acid (nadic Acid™), mono- and diglycidyl esters of end-cis-bicyclo[2.2.1]hept-5-ene-2-methyl-2,3-dicarboxylic acid (methylnadic Acid™), and mono- and glycidyl esters of allylsuccinic acid, mono- and alkylglycidyl esters of dicarboxylic acids (number of carbon atoms in the alkyl group in the monoglycidyl ester: 1 to 12), alkylglycidyl esters of p-styrenecarboxylic acid, allyl glycidyl ether, 2-methylallyl glycidyl ether, styrene-p-glycidyl ether, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene and vinylcyclohexene monoxide. Of these, glycidyl (meth)acrylate and allyl glycidyl ether are preferable.

Specific examples of the nitrogen-containing aromatic vinyl compounds include 4-vinylpyridine, 2-vinylpyridine, 5-ethyl-2-vinylpyridine, 2-methyl-5-vinylpyridine, 2-isopropenylpyridine, 2-vinylquinoline, 3-vinylisoquinoline and N-vinylcarbazole.

Specific examples of the lactam structure-containing ethylenically unsaturated compounds include N-vinylpyrrolidone.

Specific examples of the unsaturated carboxylic acids include such unsaturated carboxylic acids as acrylic acid, methacrylic acid, maleic acid, nadic acid, fumaric acid, tetrahydrophthalic acid, itaconic acid, citraconic acid, crotonic acid, isocrotonic acid, norbornenedicarboxylic acid and bicyclo[2,2,1]hept-2-ene-5,6-dicarboxylic acid.

Examples of the derivatives of unsaturated carboxylic acids include those derivatives having a structure —C(=O)—X (X is an atom selected from the Group 15 to 17 elements) such as acid anhydrides, acid halides, amides, imides and esters of the above unsaturated carboxylic acids. Specific examples include malenyl chloride, malenylimide, maleic anhydride, itaconic anhydride, citraconic anhydride, tetrahydrophthalic anhydride, bicyclo[2,2,1]hept-2-ene-5,6-dicarboxylic anhydride, dimethyl maleate, monomethyl maleate, diethyl maleate, diethyl fumarate, dimethyl itaconate, diethyl citraconate, dimethyl tetrahydrophthalate, dimethyl bicyclo[2,2,1]hept-2-ene-5,6-dicarboxylate, acrylic acid, methyl acrylate, ethyl acrylate, propyl acrylate, butyl acrylate, 2-ethylhexyl acrylate, acryloyl chloride, acrylamide, 2-hydroxyethyl acrylate, hydroxypropyl acrylate, glycidyl acrylate, aminoethyl acrylate, aminopropyl acrylate, tetrahydrofurfuryl acrylate, methacrylic acid, methyl methacrylate, ethyl methacrylate, propyl methacrylate, butyl methacrylate, 2-ethylhexyl methacrylate, methacryloyl chloride, methacrylamide, hydroxyethyl methacrylate, hydroxypropyl methacrylate, glycidyl methacrylate, aminoethyl methacrylate, aminopropyl methacrylate and tetrahydrofurfuryl methacrylate.

Of the above unsaturated carboxylic acids and derivatives thereof, preferred monomers are acrylic acid, methyl acrylate, ethyl acrylate, methacrylic acid, methyl methacrylate, ethyl methacrylate, acrylamide, methacrylamide, maleic anhydride, hydroxyethyl acrylate, hydroxyethyl methacrylate, glycidyl methacrylate, aminopropyl methacrylate, tetrahydrofurfuryl acrylate and tetrahydrofurfuryl methacrylate. Of these preferred monomers, (meth)acrylic acid, maleic anhydride, methyl (meth)acrylate, ethyl (meth)acrylate and tetrahydrofurfuryl (meth)acrylate are particularly preferable.

Examples of the vinyl ester compounds include vinyl acetate, vinyl propionate, vinyl n-butyrate, vinyl isobutyrate, vinyl pivalate, vinyl caproate, vinyl versatate, vinyl laurate, vinyl stearate, vinyl benzoate, vinyl p-(t-butyl)benzoate, vinyl salicylate and vinyl cyclohexanecarboxylate.

Examples of the nitrile group-containing unsaturated compounds include (meth)acrylonitrile, fumaronitrile, allyl cyanide and cyanoethyl acrylate. Of these, (meth)acrylonitrile is preferable.

In addition to the compounds described above, epoxy group-containing ethylenically unsaturated compounds such as allyl glycidyl ether, and vinyl silane compounds are also suitably used.

Hereinafter in the specification, the monomers having an ethylenically unsaturated group and a polar functional group in the same molecule are also written simply as the "graft monomers".

In the graft-modified polyolefin resin that forms the modified polyolefin particles of the invention, the content (x) of the grafted monomer having an ethylenically unsaturated group and a polar functional group in the same molecule is not less than 0.5 wt %, preferably not less than 1.0 wt %, more preferably not less than 1.4 wt %, still more preferably not less than 2.0 wt %, and most preferably not less than 2.4 wt %. The determination as to whether the content is not less than the lower limit may be made by rounding off the value to the first decimal place. In the invention, this content is also written as the amount of grafting or the value M. Although there is no upper limit on the amount of the grafted monomer having an ethylenically unsaturated group and a polar functional group in the same molecule, it is preferable that the content do not exceed 20 wt % because if the content is more than 20 wt %, the compatibility of the modified resin with a native polyolefin generally tends to be deteriorated. It is more preferable that the content do not exceed 8 wt %.

In the case where two or more kinds of "monomers having an ethylenically unsaturated group and a polar functional group in the same molecule" are used, it is preferable that the total content of the monomers be not less than 1.0 wt %. More preferably, the total content is in the above preferred range.

Additional Monomers

The modified polyolefin particles of the invention may be such that the polyolefin resin is grafted with a monomer having an ethylenically unsaturated group and a polar functional group in the same molecule, and further with a monomer (hereinafter, "additional monomer") which has an ethylenically unsaturated group and does not belong to the "monomers having an ethylenically unsaturated group and a polar functional group in the same molecule". In this case, the modified polyolefin particles of the invention have a structure in which repeating units derived from a monomer having an ethylenically unsaturated group and a polar functional group in the same molecule, and repeating units derived from an "additional monomer" are introduced to the polyolefin chains that form the polyolefin resin.

Examples of the "additional monomers" which may be optionally additionally grafted to the modified polyolefin particles of the invention include aromatic vinyl compounds except the aforementioned "nitrogen-containing aromatic vinyl compounds".

Examples of the aromatic vinyl compounds except the aforementioned "nitrogen-containing aromatic vinyl compounds" include those compounds represented by the following formula:

[Chem. 2]

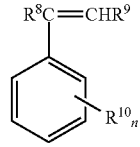

In the above formula, $R^8$ and $R^9$, which may be the same as or different from each other, are each a hydrogen atom or an alkyl group having 1 to 3 carbon atoms, with specific examples including methyl group, ethyl group, propyl group and isopropyl group, $R^{10}$ independently at each occurrence is a hydrocarbon group having 1 to 3 carbon atoms or a halogen atom, with specific examples including methyl group, ethyl group, propyl group, isopropyl group, chlorine atom, bromine atom and iodine atom, and n is usually an integer of 0 to 5, and preferably 1 to 5.

Specific examples of such aromatic vinyl compounds include styrene, α-methylstyrene, o-methylstyrene, p-methylstyrene, m-methylstyrene, p-chlorostyrene, m-chlorostyrene and p-chloromethylstyrene, with styrene being particularly preferable.

Properties and Characteristics of Modified Polyolefin Particles

The modified polyolefin particles of the invention have a relatively large molecular weight even when the amount of grafting by the graft monomer is large. Specifically, the content (x) of the grafted monomer having an ethylenically unsaturated group and a polar functional group in the same molecule, and the intrinsic viscosity [η] measured in decalin at 135° C., the units of x and [η] being wt % and dl/g, respectively, satisfy the relation:

$\log_{10}[\eta] \geq 0.1 - 0.15x$, preferably satisfy $\log_{10}[\eta] \geq 0.15 - 0.15x$, and more preferably satisfy $\log_{10}[\eta] \geq 0.2 - 0.15x$.

In other words, the value of $(\log_{10}[\eta] + 0.15x)$ is not less than 0.1, preferably not less than 0.15, and more preferably not less than 0.2.

As already mentioned, polyolefin resins are non-polar polymers and generally have a drawback in that their affinity for polar substances is low. By modifying such a resin so as to satisfy the above relation between the content (x) of a monomer having an ethylenically unsaturated group and a polar functional group in the same molecule, and the intrinsic viscosity [η] measured in decalin at 135° C., the modified polyolefin particles can attain an improvement in the affinity for polar substances while maintaining mechanical characteristics of the polyolefin resin.

Although the upper limit of the value of [η] is not limited, it is preferable that $[\eta] \leq 1.5$ dl/g.

Here, whether a modified polyolefin will satisfy the above relation between the content of a grafted monomer and the intrinsic viscosity varies depending on how the polyolefin is modified. In, for example, the conventional melt method in which a modifier is added to a polyolefin and the polyolefin is modified by being extruded in a molten state at high temperature under high shear with use of a device such as an extruder, increasing the content of the monomer introduced by grafting tends to result in a decrease in the molecular weight of the resultant modified polyolefin. It is therefore probably difficult for a modified polyolefin obtained by the melt method to satisfy the above relation. In the case of the solid phase method in which a particulate polyolefin polymer is modified at a temperature that is not more than the melting point of the polyolefin polymer, an empirical rule states that the resultant modified polyolefin tends to retain high molecular weight even when an increased amount of a monomer is introduced by grafting. Thus, modified polyolefin particles obtained by the solid phase method tend to be able to satisfy the above relation.

The modified polyolefin particles of the invention have a gel content of less than 1 wt %, preferably not more than 0.6 wt %, and more preferably not more than 0.3 wt %. The lower limit of the gel content is usually 0.0 wt % or above, preferably 0.00003 wt % or above, and more preferably 0.03 wt % or above.

In the graft-modified polyolefin resin that forms the modified polyolefin particles of the invention, as described above, the gel content needs to be less than 1 wt %, and is preferably not more than 0.6 wt %, and more preferably not more than 0.3 wt %. This gel content ensures that the modified resin can give films with good appearance free from defects such as fish eyes. For certain α-olefin polymers, in particular those except propylene homopolymer, the gel content is preferably not less than 0.00003 wt %, and more preferably not less than 0.03 wt %. It is essentially ideal that the gel content is 0. From this perspective, it is preferable in the invention that the gel content be controlled to not more than 0.00003 wt %. This gel content may be achieved by increasing the molar ratio of the monomer having an ethylenically unsaturated group and a polar functional group in the same molecule to a high value, for example, not less than 20 relative to the organic peroxide. The increase in this molar ratio, in return, raises the chance of the homopolymerization of the monomer having an ethylenically unsaturated group and a polar functional group in the same molecule. Further, such homopolymerization sometimes tends to result in the simultaneous occurrence of other problems such as less monomer being grafted to the polymer including one, or two or more α-olefins selected from $C_{2-18}$ α-olefins and having a melting point of not less than 50° C. and less than 250° C. The above preferred range of the gel content, in particular for those α-olefin polymers except propylene homopolymer, is adopted in light of these aspects.

The graft-modified polyolefin resin described above, when used in composite materials such as carbon fiber-reinforced materials, can give composite materials having excellent mechanical strength by virtue of its containing few defects which can serve as the origins of breakage.

Here, the gel content in the present invention is determined by placing approximately 0.3 g of the modified polyolefin particles into a 330 mesh (45 μm opening) metal gauge, adding 100 ml of xylene to the modified polyolefin particles in the gauge, heating the mixture under reflux for 2 hours, and calculating the ratio of the weight of undissolved components retained in the metal gauge to the weight of the whole of the modified polyolefin particles, and refers to such a ratio.

When the polymer is a propylene.ethylene random copolymer or a homopolymer or copolymer based on 4-methylpentene-1, the modified polyolefin particles of the invention preferably satisfy the relation:

$|\eta^*|_{0.1} \div |\eta^*|_{10} \leq 1 + 0.07 \times [\log_{10}\{|\eta^*|_1\}]^{3.4}$, or more preferably satisfy the relation:

$|\eta^*|_{0.1} \div |\eta^*|_{10} \leq 1 + 0.05 \times [\log_{10}\{|\eta^*|_1\}]^{3.5}$, wherein $|\eta^*|_{0.1}$ (Pa·sec), $|\eta^*|_1$ (Pa·sec) and $|\eta^*|_{10}$ (Pa·sec) are the complex viscosities of the modified polyolefin particles measured at a temperature in the range of from the polymer's melting point (Tm)+20° C. to Tm+30° C. at an angular frequency ω=0.1 rad/sec, an angular frequency ω=1 rad/sec, and an angular frequency ω=10 rad/sec, respectively, with use of a rotary rheometer. The satisfaction of the above relation by the value of $|\eta^*|_{0.1} \div |\eta^*|_{10}$ means that the amount of long-chain branches is small and the gel fraction is generally less than 1 wt %.

Further, the modified polyolefin particles of the invention usually have an average particle size of not less than 0.2 mm and not more than 10 mm, preferably not less than 0.2 mm and not more than 2.5 mm, more preferably not less than 0.3 mm and not more than 1.5 mm, and still more preferably not less than 0.3 mm and not more than 0.7 mm. In the invention, the average particle size means the average particle size measured by a laser diffraction scattering method (when the average particle size is less than 1 mm) or by a sieve classification method (when the average particle size is 1 mm or above). The modified polyolefin particles of the invention, by virtue of having the above average particle size, attain good handleability and workability when they are shaped or mixed together with various resins.

Here, the present inventors have found that the surface of modified polyolefin particles obtained by the conventional solid phase method has irregularities but is dense without any holes. In the case the surface of modified polyolefin particles is dense without any holes, there is a risk that, for example, known additives for imparting physical properties or chemical properties to the particles, for example, complex-forming agents, surfactants and antioxidants having various functional groups cannot be introduced (adsorbed) effectively enough to give rise to physical or chemical properties. For example, such denseness of the surface of particles will make it difficult to enhance storage stability by the introduction of a stabilizer. When, as an example, an antioxidant is to be introduced to modified polyolefin particles to enhance oxidation stability, known techniques encounter economic disadvantages because of having no other choices but to increase the amount of the antioxidant for imparting oxidation stability. Pelletization is one possible approach to introducing an antioxidant, but the production of pellets requires a large amount of thermal energy. In light of the advantage that the solid phase method can produce particles with less energy, further improvements are necessary. In the modified polyolefin particles of the present invention, it is preferable that when the surface of the particles is observed using a scanning electron microscope with 10000 times magnification, the surface of the particles have a 1 μm×1 μm region containing 5 to 400 holes having a size of 0.05 μm to 0.2 μm.

Here, the holes of interest in the modified polyolefin particles of the invention are those having a size of 0.05 μm to 0.2 μm in a 1 μm×1 μm region. This is based on an assumption that holes having the above size are effective for uniformly introducing, into the polyolefin particles, known additives that impart physical properties or chemical properties to the particles, for example, a stabilizer for enhancing storage stability, or more specifically an antioxidant for enhancing storage stability such as oxidation resistance of the polyolefin particles. In the invention, the number of 0.05 μm to 0.2 μm holes present in the 1 μm×1 μm region is 5 holes to 400 holes, preferably 10 holes to 100 holes, and more preferably 20 holes to 50 holes. The modified polyolefin particles having such 1 μm×1 μm regions on the surface are expected to allow the additives such as a stabilizer to be introduced into the polyolefin particles uniformly.

In the invention, specifically, the surface of the particles may be observed by looking into the particle surface with respect to randomly selected three portions in a 13 μm×10 μm field of view. In this case, the modified polyolefin particles of the invention preferably have the above 1 μm×1 μm region in one or more of the three portions of the surface.

In a production method of the invention described later, modified polyolefin particles of the invention are sometimes obtained starting from pellets as polyolefin particles. Specifically, various additives are added to a polyolefin as required, the mixture is melt kneaded, and the kneadate, after being solidified by cooling or in the molten state, is granulated into particles with use of a cutting device such as a pelletizer. When modified polyolefin particles are obtained from such pellets, the holes described hereinabove are not sometimes found on the surface even if the modified particles are obtained by the inventive production method described later. To ensure that the modified polyolefin particles of the present application will reliably have the aforementioned holes on the surface, it is preferable that the modified polyolefin particles be obtained by the inventive production method described later starting from "particles other than pellets" described later. As will be described later, the "particles other than pellets" usually have an average particle size of not more than 2.5 mm. Thus, it is preferable that the modified polyolefin particles of the present application have a corresponding average particle size of not more than 2.5 mm.

In the present invention, the type and content of a specific component are sometimes taken into consideration in the evaluation of the characteristics of the modified polyolefin particles. As will be described later, the modified polyolefin particles of the invention are produced most often in the presence of a radical initiator. As will be described later, modified polyolefin particles satisfying the aforementioned requirements (1) to (3) tend to be obtained easily by the use of a specific radical initiator. In this case, the types and contents of components that are derived from the radical initiator present in the modified polyolefin particles tend to be varied depending on the radical initiator used. In light of these facts, the types and contents of specific components present in the modified polyolefin particles can be important evaluation items in the estimation of the characteristics of the modified polyolefin particles.

In the present invention, specifically, the contents of subject components may be measured under the measurement conditions (a) described below.

Measurement conditions (a): The modified polyolefin particles are heated at 190° C. for 30 minutes, and the resultant gas is analyzed by headspace gas chromatography.

One of the components present in the modified polyolefin particles which can be a particular evaluation subject in the invention is an alcohol with 150 or less molecular weight, in particular, an aliphatic alcohol with 150 or less molecular weight. Thus, the modified polyolefin particles of the invention are preferably such that the content of an alcohol with 150 or less molecular weight measured under the measurement conditions (a) is in the range of 1 to 10000 μg per 1 g of the modified polyolefin particles.

The modified polyolefin particles of the invention are obtained by graft reacting a specific monomer having an ethylenically unsaturated group and a polar functional group in the same molecule to a polyolefin resin in the presence of a radical initiator. A preferred radical initiator is an organic peroxide that generates, upon thermal decomposition, an alkoxy radical with 150 or less molecular weight, more specifically, an organic peroxide that includes an aliphatic alkoxy radical moiety with 150 or less molecular weight as a constituent moiety of the peroxide. In the invention, the term "radical moiety" indicates a partial structure in the molecule and is distinguished from the term "radical" which indicates a reaction intermediate or an actual molecular species. Here, the alcohol with 150 or less molecular weight is formed by the abstraction of a hydrogen atom from the polyolefin by the alkoxy radical generated by the thermal decomposition of the organic peroxide used as the initiator of the grafting reaction. In the invention, the content of such an alcohol with 150 or less molecular weight is evaluated more strictly and more specifically as the content of an aliphatic alcohol with 150 or less molecular weight that is measured by headspace gas chromatography of the gas generated by heating of the particles at 190° C. for 30 minutes. In the invention, the aliphatic alcohol with 150 or less molecular weight, which is measured by headspace gas chromatography of the gas generated by heating at 190° C. for 30 minutes, is a product resulting from the hydrogen abstraction of the polyolefin by the alkoxy radical generated by the thermal decomposition of the organic peroxide used as the grafting reaction initiator. The radical generated by the thermal decomposition of the organic peroxide abstracts a hydrogen atom from the polyolefin and thus generates a new radical on the molecular chain of the polyolefin which serves as the origin of the grafting reaction.

The molecular weight of the alcohol, more strictly, the aliphatic alcohol which may be present in the modified polyolefin particles of the invention is preferably not more than 110, more preferably not more than 100, and still more preferably not more than 80. Examples of the aliphatic alcohols with 150 or less molecular weight satisfying this condition include t-butyl alcohol (molecular weight 74), t-hexyl alcohol (molecular weight 102), isopropyl alcohol (molecular weight 60), ethanol (molecular weight 46) and methanol (molecular weight 32). Of these, t-butyl alcohol and isopropyl alcohol are preferable, and t-butyl alcohol is particularly preferable.

In the invention, it is preferable that the gas generated by heating of the particles at 190° C. for 30 minutes, as analyzed by headspace gas chromatography, be free from an aliphatic alcohol with a molecular weight of higher than 150, and it is more preferable that the gas be free from an aliphatic alcohol with a molecular weight of higher than 110. That is, even when the measurement under the measurement conditions (a) targets the content of an alcohol with 110 or less molecular weight, it is preferable that the content of an alcohol with 110 or less molecular weight be in the range of 1 to 10000 μg per 1 g of the modified polyolefin particles, and it is more preferable that the content of an alcohol with 110 or less molecular weight and the content of an alcohol with 150 or less molecular weight be the same.

Some example substances which may be generated by the thermal decomposition of the organic peroxide, other than aliphatic alcohols, are ethers, ketones, aliphatic hydrocarbons and aromatic hydrocarbons.

In this case, it is more preferable that the molecular weight of such ethers, ketones, aliphatic hydrocarbons and aromatic hydrocarbons measured by the headspace gas chromatography of the gas generated by heating at 190° C. for 30 minutes do not exceed 150 in principle.

However, the modified polyolefin particles of the invention may contain an aromatic ring-containing compound with 250 or less molecular weight in addition to the aliphatic alcohol with 150 or less molecular weight. In this case, it is preferable that the content of such an aromatic ring-containing compound with 250 or less molecular weight measured under the aforementioned measurement conditions (a) be in the range of 1 to 10000 μg per 1 g of the modified polyolefin particles.

As already mentioned hereinabove, a preferred radical initiator in the invention is an organic peroxide that includes an aliphatic alkoxy radical moiety with 150 or less molecular weight as a constituent moiety of the peroxide. In a preferred embodiment of the invention, such an organic peroxide may also include an aromatic ring-containing compound radical moiety with 250 or less molecular weight as another constituent moiety of the peroxide. In the invention, the aromatic ring-containing compound with 250 or less molecular weight, which is measured by headspace gas chromatography of the gas generated by heating at 190° C. for 30 minutes, is in most cases a product resulting from the hydrogen abstraction of the polyolefin by the radical generated by the thermal decomposition of the organic peroxide used as the grafting reaction initiator, similarly to the aliphatic alcohol with 150 or less molecular weight. However, the products derived from the radicals generated by the thermal decomposition of the organic peroxide are not limited to those resulting from the hydrogen abstraction of the polyolefin, but are also formed at times through other routes such as scission and/or rearrangement of bonds in the radicals. When, for example, a benzoyloxy radical is generated by the thermal decomposition of the organic peroxide, the radical may sometimes undergo decarbonization reaction to form benzene. When, further, a cumyloxy radical is generated by the thermal decomposition of the organic peroxide, a methyl radical and acetophenone are sometimes formed as secondary products by β-scission. The radical generated by the thermal decomposition of the organic peroxide abstracts a hydrogen atom from the polyolefin and thus generates a new radical on the molecular chain of the polyolefin which serves as the origin of the grafting reaction.

When the modified polyolefin particles of the invention contain an aromatic ring-containing compound with 250 or less molecular weight, the molecular weight of the aliphatic alcohol, similarly as described hereinabove, is preferably not more than 110, more preferably not more than 100, and still more preferably not more than 80. Examples of the aliphatic alcohols with 150 or less molecular weight satisfying this condition are the same as described hereinabove.

The molecular weight of the aromatic ring-containing compound which may be present in the modified polyolefin particles of the invention is not more than 250, more preferably not more than 200, and still more preferably not more than 150. Examples of the aromatic ring-containing compounds satisfying this condition include acetophenone (molecular weight 120), α-cumyl alcohol (molecular weight 136), 3'-acetylacetophenone (molecular weight 162), 2-(3-acetylphenyl)-2-propanol (molecular weight 178), α,α'-dihydroxy-1,3-diisopropylbenzene (molecular weight 194), benzene (molecular weight 78), benzoic acid (molecular weight 122), methylbenzoic acid (molecular weight 136) and dimethylbenzoic acid (molecular weight 150). Of these compounds, benzene, benzoic acid, methylbenzoic acid and dimethylbenzoic acid are more preferable, and benzene is particularly preferable.

In the modified polyolefin of the invention, the content of an alcohol with 150 or less molecular weight, more strictly, the content of an aliphatic alcohol with 150 or less molecular weight is in the range of 1 μg to 10000 μg, preferably in the range of 30 μg to 5000 μg, and more preferably in the range of 40 μg to 3000 μg per 1 g of the modified polyolefin particles.

When the modified polyolefin of the invention contains an aromatic ring-containing compound with 250 or less molecular weight, the contents of an aliphatic alcohol with 150 or less molecular weight and such an aromatic ring-containing compound with 250 or less molecular weight which may be present in the modified polyolefin of the invention are each in the range of 1 μg to 10000 μg, preferably in the range of 10 μg to 5000 μg, more preferably in the range of 20 μg to 500 μg, and most preferably in the range of 20 μg to 50 μg per 1 g of the modified polyolefin particles.

If the content of an alcohol with 150 or less molecular weight, more strictly, the content of an aliphatic alcohol with 150 or less molecular weight in the modified polyolefin of the invention is higher than the above upper limit, in particular, if the content is higher than 10000 μg per 1 g of acid-modified polyolefin particles, the bonding performance with respect to polar substances may be adversely affected. This is also the case when the modified polyolefin of the invention contains an aromatic ring-containing compound with 250 or less molecular weight and when the content of such an aromatic ring-containing compound with 250 or less molecular weight is higher than the aforementioned upper limit, in particular, when the content is higher than 10000 μg per 1 g of the modified polyolefin particles.

A complicated purification step is necessary in order to control the content of an alcohol with 150 or less molecular weight, more strictly, the content of an aliphatic alcohol with 150 or less molecular weight to below 1 μg per 1 g of the modified polyolefin particles, and such purification is not realistic. When the modified polyolefin of the invention contains an aromatic ring-containing compound with 250 or less molecular weight, similarly, a complicated purification step is necessary in order to control the content of an aromatic ring-containing compound with 250 or less molecular weight to below 1 μg per 1 g of the modified polyolefin particles, and such purification is not realistic.

The reason why such high purification is unrealistic will be discussed in detail below. The reduction of the content of an aliphatic alcohol to below 1 μg per 1 g is possible by, for example, a method (called "reprecipitation method) in which the graft-modified polyolefin particles are dissolved into a solvent such as toluene or xylene at high temperature, the solution is cooled, and a polar solvent such as acetone is added to cause a precipitate, which is then recovered. However, in general, the reprecipitation method involves large amounts of a solvent and thermal energy and is not always beneficial in terms of cost. For this reason, while the present invention does not exclude a possibility that one or both of the content of an aliphatic alcohol with 150 or less molecular weight and the content of an aromatic ring-containing compound with 250 or less molecular weight are reduced to below 1 μg per 1 g of the modified polyolefin particles, such high purification is not necessarily beneficial in view of the cost of the reprecipitation method.

The content of an aliphatic alcohol and the content of an aromatic ring-containing compound with 250 or less molecular weight in the modified polyolefin may be each controlled to fall in the range specified in the invention by washing the graft-modified polyolefin particles with a solvent which:

has permeability through the polyolefin particles before the grafting reaction, and can dissolve the unreacted monomer having an ethylenically unsaturated group and a polar functional group in the same molecule, and the aliphatic alcohol with 150 or less molecular weight and aromatic ring-containing compound with 250 or less molecular weight that are derived from the organic peroxide.

Examples of such solvents include aliphatic hydrocarbons such as hexane, heptane, decane and cyclohexane; aromatic hydrocarbons such as benzene, toluene and xylene; ketones such as acetone, methyl ethyl ketone, methyl isobutyl ketone, acetophenone, benzophenone and cyclohexanone; alcohols such as benzyl alcohol, 1-butanol, 2-butanol, t-butanol, 1-pentanol, 2-pentanol, 3-pentanol, 2-ethyl-1-hexanol, normal propyl alcohol, isopropyl alcohol, ethanol and methanol; ethers such as ethyl ether, ethylene glycol monomethyl ether, anisole, phenyl ether, dioxane and tetrahydrofuran; esters such as ethyl acetate and butyl acetate; and mixed solvents including two or more of the above solvents. Ketones and alcohols are preferable, and acetone and isopropyl alcohol are particularly preferable. The washing temperature may be room temperature or above as long as the graft-reacted polyolefin particles maintain the form of particles, but is preferably room temperature to 110° C., more preferably 40 to 100° C., and still more preferably 50 to 80° C.

When the washing temperature is set to above the boiling point of the washing solvent at atmospheric pressure, it is preferable that washing be performed in a tightly closed space in order to prevent the loss of the washing solvent by evaporation. In this regard, the washing treatment is preferably performed in an autoclave.

Organic Peroxides

The modified polyolefin particles of the present invention may be obtained using any type of an organic peroxide as a radical initiator as long as the production is such that a monomer having an ethylenically unsaturated group and a polar functional group in the same molecule is grafted to a polymer which includes one, or two or more α-olefins selected from $C_{2-18}$ α-olefins and which has a melting point of not less than 50° C. and less than 250° C., namely, to the polyolefin resin described hereinabove, and also as long as the modified polyolefin particles satisfy the aforementioned requirements (1) to (3). Preferably, the modified polyolefin particles are obtained by the grafting reaction of the polyolefin resin in the presence of a radical initiator that is an organic peroxide including an aliphatic alkoxy radical moiety with 150 or less molecular weight as a constituent moiety of the peroxide.

In a more preferred embodiment, the modified polyolefin particles of the invention are obtained by the grafting reaction of the polyolefin resin in the presence of a radical initiator that is an organic peroxide including an aliphatic alkoxy radical moiety with 110 or less molecular weight as a constituent moiety of the peroxide. Specifically, it is preferable in the present invention that the molecular weight of the aliphatic alkoxy radical moiety with 150 or less molecular weight, which constitutes the organic peroxide, be not more than 110.

Examples of such organic peroxides include:

organic peroxides including an n-propyloxy radical moiety (molecular weight 59) as a constituent moiety, such as di-n-propyl peroxydicarbonate;

organic peroxides including an isopropyloxy radical moiety (molecular weight 59) as a constituent moiety, such as diisopropyl peroxydicarbonate;

organic peroxides including a sec-butyloxy radical moiety (molecular weight 73) as a constituent moiety, such as di-sec-butyl peroxydicarbonate;

organic peroxides including a t-butyloxy radical moiety (molecular weight 73) as a constituent moiety, such as t-butyl peroxyneodecanoate, t-butyl peroxyneoheptanoate, t-butyl peroxypivalate, t-butyl peroxy-2-ethylhexanoate, t-butyl peroxyisobutyrate, 1,1-di(t-butyl peroxy)-2-methylcyclohexane, 1,1-di(t-butyl peroxy)cyclohexane, 2,2-di(4,4-di-(t-butyl peroxy)cyclohexyl)propane, t-butylperoxymaleic acid, t-butyl peroxy-3,5,5-trimethylhexanoate, t-butyl peroxylaurate, t-butyl peroxyisopropyl monocarbonate, t-butyl peroxy-2-ethylhexyl monocarbonate, t-butyl peroxyacetate, 2,2-di-(t-butyl peroxy)butane, t-butyl peroxyisononanoate, t-butyl peroxybenzoate, n-butyl-4,4-di-(t-butyl peroxy)valerate, methyl ethyl ketone peroxide, di(2-t-butyl peroxyisopropyl)benzene, ethyl-3,3-di(t-butyl peroxy) butyrate, 1,3-di(2-t-butyl peroxyisopropyl)benzene, 2,5-dimethyl-2,5-di-(t-butyl peroxy)hexane, t-butylcumyl peroxide, di-t-butyl peroxide, 2,5-dimethyl-2,5-di-(t-butyl peroxy)hexyne-3, t-butyl hydroperoxide, and 1,1-di(t-butyl peroxy)-3,3,5-trimethylcyclohexane;

organic peroxides including a t-amyloxy radical moiety (molecular weight 87) as a constituent moiety, such as t-amyl peroxyneodecanoate, t-amyl peroxypivalate, t-amyl peroxy-2-ethylhexanoate, 1,1-di(t-amyl peroxy)cyclohexane, t-amyl peroxyisononanoate, t-amyl peroxy-normal octoate, t-amyl peroxyisopropyl monocarbonate, t-amyl peroxy-2-ethylhexyl monocarbonate, t-amyl peroxyacetate, t-amyl peroxybenzoate, di-t-amyl peroxide and t-amyl hydroperoxide; and organic peroxides including a t-hexyloxy radical moiety (molecular weight 101) as a constituent moiety, such as t-hexyl peroxyneodecanoate, t-hexyl peroxypivalate, t-hexyl peroxy-2-ethylhexanoate, 1,1-di(t-hexyl peroxy)-3,3,5-trimethylcyclohexane, 1,1-di(t-hexyl peroxy)cyclohexane, t-hexyl peroxyisopropyl monocarbonate, t-hexyl peroxybenzoate and di-t-hexyl peroxide. Of these, organic peroxides including a t-butyloxy radical moiety as a constituent moiety and organic peroxides including an isopropyloxy radical moiety as a constituent moiety are preferable, and organic peroxides including a t-butyloxy radical moiety as a constituent moiety are particularly preferable.

In the invention, as listed above, those organic peroxides which include an aliphatic alkoxy radical moiety free from aromatic rings may be particularly suitably used as the "organic peroxides including an aliphatic alkoxy radical moiety with 150 or less molecular weight as a constituent moiety of the peroxide". This preference, however, does not exclude a possibility that those organic peroxides which include an aliphatic alkoxy radical moiety having an aromatic ring are used as the "organic peroxides including an aliphatic alkoxy radical moiety with 150 or less molecular weight as a constituent moiety of the peroxide" in the invention. Examples of such organic peroxides include those organic peroxides including a cumyloxy radical moiety (molecular weight 135) as a constituent moiety, such as dicumyl peroxide and cumyl peroxyneodecanoate.

The organic peroxides may be used singly, or two or more may be used in combination.

From the point of view of the compatibility with polyolefins, the organic peroxide is more preferably one which does not include in the molecular formula, except an aromatic ring-containing compound radical moiety with 250 or less molecular weight described later, a radical moiety with a molecular weight of above 150, for example, a radical moiety represented by the structural formula (1) or (2) below. ($R_1$ in the formula (1) is a hydrocarbon group having a molecular weight of not less than 107, and $R_2$ in the formula (2) is a hydrocarbon group having a molecular weight of not less than 91.) Examples of the radical moieties represented by the formulae (1) and (2) include radical moieties represented by the structural formulae (1') and (2') below, respectively.

[Chem. 3]

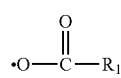

(1)

[Chem. 4]

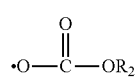

(2)

[Chem. 5]

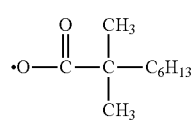

(1')

[Chem. 6]

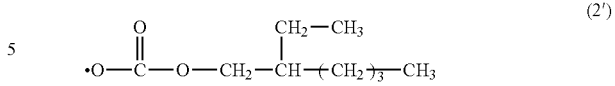

(2')

Preferred organic peroxides in the present invention are 2,5-dimethyl-2,5-di-(t-butyl peroxy)hexane, di-t-butyl peroxide and t-butyl peroxyisopropyl monocarbonate. Of these, t-butyl peroxyisopropyl monocarbonate is particularly preferable.

The organic peroxide which generates, upon thermal decomposition, an alkoxy radical with 150 or less molecular weight, in particular, the organic peroxide which includes an aliphatic alkoxy radical moiety with 150 or less molecular weight, or preferably with 110 or less molecular weight as a constituent moiety of the peroxide exhibits good compatibility with the polyolefin resin to be modified. By virtue of this and also because the radical generated therefrom has a low molecular weight, the solid phase reaction of the impregnated polyolefin takes place while the diffusion inside the solid phase is facilitated. This is probably advantageous not only for increasing the amount of grafting but also for introducing the grafts uniformly over the entirety of the particles.

As described hereinabove, the radical initiator used in the invention is preferably an organic peroxide including an aliphatic alkoxy radical moiety with 150 or less molecular weight as a constituent moiety of the peroxide. In another preferred embodiment, the modified polyolefin particles of the invention are obtained by the grafting reaction of the polyolefin resin in the presence of a radical initiator that is an organic peroxide including an aliphatic alkoxy radical moiety with 150 or less molecular weight and an aromatic ring-containing compound radical moiety with 250 or less molecular weight as constituent moieties of the peroxide.

Examples of such organic peroxides include t-butyl cumyl peroxide, 1,3-di(2-t-butyl peroxyisopropyl)benzene, t-butyl peroxybenzoate, t-amylperoxybenzoate, t-hexylperoxybenzoate and 2,5-dimethyl-2,5-di(benzoyl peroxy)hexane. These organic peroxides may be used singly, or two or more may be used in combination. Of these, t-butyl peroxybenzoate, t-amyl peroxybenzoate and t-hexyl peroxybenzoate are more preferable, and t-butyl peroxybenzoate is particularly preferable.

The organic peroxide including an aliphatic alkoxy radical moiety with 150 or less molecular weight and an aromatic ring-containing compound radical moiety with 250 or less molecular weight as constituent moieties of the peroxide exhibits good compatibility with the polyolefin resin to be modified. By virtue of this and also because the radicals generated therefrom have a low molecular weight, the solid phase reaction of the impregnated polyolefin takes place while the diffusion inside the solid phase is facilitated. This is probably advantageous not only for increasing the amount of grafting but also for introducing the grafts uniformly over the entirety of the particles.

The organic peroxide in the invention may include an aliphatic alkoxy radical moiety with 150 or less molecular weight and an aromatic ring-containing compound radical moiety with 250 or less molecular weight as separate constituent moieties. In another embodiment, the organic peroxide used as the radical initiator may include a radical moiety that is an aliphatic alkoxy radical moiety with 150 or less molecular weight and is also an aromatic ring-containing compound radical moiety with 250 or less molecular weight, such as, for example, cumyloxy radical moiety (molecular weight 135). Modified polyolefin particles obtained using such an organic peroxide as the radical initiator can constitute another preferred embodiment of the invention. Examples of such organic peroxides include dicumyl peroxide and cumyl peroxyneodecanoate. Such an organic peroxide provides similar effects as the organic peroxide including an aliphatic alkoxy radical moiety with 150 or less molecular weight and an aromatic ring-containing compound radical moiety with 250 or less molecular weight as constituent moieties of the peroxide.

The organic peroxide is usually used in an amount of 0.01 to 30 parts by weight, preferably 1 to 20 parts by weight, and more preferably 2 to 15 parts by weight per 100 parts by weight of the polyolefin particles subjected to the grafting reaction.

(Methods for Producing Modified Polyolefin Particles)

The modified polyolefin particles of the invention described above may be produced by any method without limitation as long as the modified polyolefin particles obtained satisfy the aforementioned requirements.

In a preferred production method, the modified polyolefin particles of the invention are obtained by the grafting reaction of a monomer having an ethylenically unsaturated group and a polar functional group in the same molecule to polyolefin particles which include a polymer including one, or two or more α-olefins selected from $C_{2-18}$ α-olefins and having a melting point of not less than 50° C. and less than 250° C. This grafting reaction may be performed using an organic peroxide, in particular, the organic peroxide described hereinabove in the section of "Organic peroxides" as an initiator, at a temperature of not more than the melting point (Tm) of the polyolefin particles. The average particle size of the polyolefin particles may be, for example, 0.2 mm to 2.5 mm, but is not limited thereto as will be described later. In an exemplary embodiment of the invention, the melting point of the polyolefin particles is not less than 50° C. and less than 240° C., but the melting point is not limited thereto and may be 240° C. or above as long as the melting point is in the aforementioned range.

The grafting reaction may take place without a solvent, but is preferably performed in the presence of an organic solvent.

More specifically, modified polyolefin particles of the invention may be suitably obtained by impregnating polyolefin particles which include a polymer including one, or two or more α-olefins selected from $C_{2-18}$ α-olefins and having a melting point of not less than 50° C. and less than 250° C. and which have an average particle size of, for example, 0.2 mm to 10 mm, or preferably 0.2 mm to 2.5 mm, with the following three components while ensuring that the polyolefin particles remain solid:

a monomer having an ethylenically unsaturated group and a polar functional group in the same molecule, an organic peroxide, in particular, the organic peroxide described hereinabove in the section of "Organic peroxides", and an organic solvent, and performing the grafting reaction at a temperature that is not more than the melting point Tm of the polyolefin resin. Here, the melting point Tm of the polyolefin resin is the melting point measured by analyzing the polyolefin resin by differential scanning thermal analysis at a heatup rate of 10° C./min.

In the case where the polyolefin resin exhibits two or more melting peaks, the lower peak temperature is taken as the melting point.

Examples of the heating methods for performing the grafting reaction at a temperature that is not more than the melting point Tm of the polyolefin resin include direct heating with an electrothermal heater, indirect heating with a heating medium heated with an electrothermal heater, and infrared heating with an infrared heater or the like. Examples of the heating media include silicone oil and water vapor. Further, the heating may be also performed by the application of microwaves.

The polyolefin particles subjected to the grafting reaction may be those which include the polyolefin resin described hereinabove in the section of "Polyolefin resins", and usually have an average particle size of not less than 0.2 mm and not more than 10 mm, preferably not less than 0.2 mm and not more than 2.5 mm, more preferably not less than 0.3 mm and not more than 1.5 mm, and still more preferably not less than 0.3 mm and not more than 0.7 mm.

When modified polyolefin particles are obtained by the graft reaction of the polyolefin particles in the form of pellets, the holes described hereinabove are not sometimes found on the surface of the modified polyolefin particles. To ensure that the modified polyolefin particles obtained will reliably have the aforementioned holes, it is preferable that the polyolefin particles subjected to the grafting reaction be particles other than pellets. Such "particles other than pellets" usually have an average particle size of not more than 2.5 mm.

The monomer used in the grafting reaction which has an ethylenically unsaturated group and a polar functional group in the same molecule is one described hereinabove in "Monomers having ethylenically unsaturated group and polar functional group in the same molecule", and the amount thereof is usually 0.01 to 50 parts by weight, preferably 1 to 20 parts by weight, more preferably 2 to 16 parts by weight, and particularly preferably 2 to 15.5 parts by weight per 100 parts by weight of the polyolefin particles.

The organic peroxide used in the grafting reaction is typically one described hereinabove in "Organic peroxides", and the amount thereof is usually 0.01 to 30 parts by weight, preferably 1 to 20 parts by weight, and more preferably 2 to 15 parts by weight per 100 parts by weight of the polyolefin particles.

In the method for producing modified polyolefin particles of the invention, the gel content in the obtainable modified polyolefin particles tends to be affected by the ratio of the amount of the "monomer having an ethylenically unsaturated group and a polar functional group in the same molecule" to the amount of the "organic peroxide". Specifically, the gel content in the obtainable modified polyolefin particles tends to be decreased with increasing ratio of the "monomer having an ethylenically unsaturated group and a polar functional group in the same molecule" to the "organic peroxide". It is, on the other hand, preferable that the ratio of the "monomer having an ethylenically unsaturated group and a polar functional group in the same molecule" to the "organic peroxide" be small to a certain extent in order to ensure a sufficient amount (efficiency) of grafting. In light of these facts, the value (ratio) of (number of moles of monomer having ethylenically unsaturated group and polar functional group in the same molecule)÷(number of moles of organic peroxide) used in the grafting reaction is usually in the range of 1 to 20, preferably 2 to 15, more preferably 3 to 10, and still more preferably 3.5 to 6.

The above ratio may be controlled depending on the type of the "polyolefin resin". For example, the ratio may be:

1.5 to 10, or preferably 2 to 10 for a propylene homopolymer, 3 to 10, preferably 4 to 10, or more preferably 5 to 10 for a propylene-based polymer, in particular, a propylene random copolymer, and 4 to 15, preferably 5 to 15, or more preferably 6.5 to 15 for a random copolymer or homopolymer based on 4-methylpentene-1.

When the value (ratio) of (number of moles of monomer having ethylenically unsaturated group and polar functional group in the same molecule)÷(number of moles of organic peroxide) is in the above range, the modified polyolefin particles obtained tend to attain a low gel content.

The organic solvent used in the grafting reaction is preferably a solvent which can swell the amorphous olefin polymer components of the polyolefin particles, namely, a swelling solvent. The use of a swelling solvent as the organic solvent allows the monomer having an ethylenically unsaturated group and a polar functional group in the same molecule and the organic peroxide to enter deep into the polyolefin particles and thus makes it possible to modify the polyolefin particles uniformly to the inside of the particles.

Examples of such swelling solvents include aromatic hydrocarbon solvents such as benzene, toluene and xylene, aliphatic hydrocarbon solvents such as pentane, hexane, heptane, octane, nonane and decane, alicyclic hydrocarbon solvents such as cyclohexane, methylcyclohexane and decahydronaphthalene, chlorinated hydrocarbon solvents such as chlorobenzene, dichlorobenzene, trichlorobenzene, methylene chloride, chloroform, carbon tetrachloride and tetrachloroethylene, 1-methyl-2-pyrrolidone, ethylene carbonate, propylene carbonate, γ-butyrolactone, N-methyl-2-pyrrolidone, propylene glycol monomethyl ether acetate, tributyl acetylcitrate, 2,4-pentadiene, dimethyl sulfoxide, n-alkyl adipate, 2,2,4-trimethyl-1,3-pentanediol diisobutyrate and 3-methoxy-3-methyl-1-butyl acetate. Of these, toluene and benzene chloride are preferable.

The swelling solvents may be used singly, or two or more may be used in combination.

The organic solvent used in the grafting reaction may be a mixture of the above swelling solvent and an appropriate amount of a poor solvent. Examples of the poor solvents include alcohol solvents such as methanol, ethanol, n-propanol, iso-propanol, n-butanol, sec-butanol and tert-butanol, ketone solvents such as acetone, methyl ethyl ketone and methyl isobutyl ketone, ester solvents such as ethyl acetate and dimethyl phthalate, and ether solvents such as dimethyl ether, diethyl ether, di-n-amyl ether, tetrahydrofuran and dioxyanisole. The amount of the poor solvent may be, for example, 0.1 to 100 parts by weight per 100 parts by weight of the swelling solvent.

The organic solvent that is a mixture of a swelling solvent and a poor solvent, when brought into contact with the polyolefin particles used as described above, swells the polyolefin particles, in particular, the amorphous olefin polymer components of the polymer particles to facilitate the entry of the modifier and the radical initiator into the particles.

When the above swelling solvent is used, the amount of the swelling solvent is usually 5 to 50 parts by weight, and preferably 12 to 40 parts by weight per 100 parts by weight of the polyolefin particles. This amount of the swelling solvent ranging from 5 to 50 parts by weight, when expressed as the concentration of the polyolefin relative to the total amount of the polyolefin and the swelling solvent, is equivalent to 952 g/kg to 667 g/kg. Similarly, the amount ranging from 12 to 40 parts by weight corresponds to 892 g/kg to 714 g/kg.

In the invention, the organic solvent is preferably one which has a boiling point at atmospheric pressure of less than (Tm−10) ° C. wherein Tm is the melting point of the polyolefin resin constituting the polyolefin particles, measured by differential scanning thermal analysis at a heatup rate of 10° C./min. An organic solvent having such a boiling point exhibits good molecular mobility at the grafting reaction temperature and attains higher swelling effects.

In the production method of the invention, the polyolefin particles, the monomer having an ethylenically unsaturated group and a polar functional group in the same molecule, and the organic peroxide may be brought into contact together in any manner and in any order without limitation. Various fashions of contacting may be used.

Examples of the orders and manners in which the above components are contacted include the following:

(p1) The polyolefin particles, the monomer having an ethylenically unsaturated group and a polar functional group in the same molecule, the organic peroxide and the organic solvent are mixed together to give a mixture, and the mixture is subjected to the reaction.

(p2) The polyolefin particles, the monomer having an ethylenically unsaturated group and a polar functional group in the same molecule, and the organic solvent are mixed together beforehand at an elevated temperature to give a raw material mixture. The raw material mixture is cooled and is thereafter mixed together with the organic peroxide, and the resultant mixture is subjected to the reaction.

(p3) The polyolefin particles, the monomer having an ethylenically unsaturated group and a polar functional group in the same molecule, and the organic solvent are mixed together to give a raw material mixture. Next, the raw material mixture is brought to a condition substantially ready for the reaction by heating or the like of the raw material mixture. Thereafter, the organic peroxide is added, and the reaction is allowed to take place.

(p4) The polyolefin particles, the organic peroxide and the organic solvent are mixed together to give a raw material mixture. Next, the raw material mixture is brought to a condition substantially ready for the reaction by heating or the like of the raw material mixture. Thereafter, the monomer having an ethylenically unsaturated group and a polar functional group in the same molecule is added, and the reaction is allowed to take place.

(p5) The polyolefin particles are brought to a condition substantially ready for the reaction by heating or the like. Thereafter, the polyolefin particles are subjected to any of the following steps (s5a) to (s5d):

(s5a) The particles are mixed together with the monomer having an ethylenically unsaturated group and a polar functional group in the same molecule, the organic peroxide and the organic solvent at the same time, and the materials are reacted.

(s5b) The monomer having an ethylenically unsaturated group and a polar functional group in the same molecule, the organic peroxide and the organic solvent are each divided into portions. The particles are then mixed together with the portions of the respective components at the same time, portion by portion, and the materials are reacted.

(s5c) One or two components of the monomer having an ethylenically unsaturated group and a polar functional group in the same molecule, the organic peroxide and the organic solvent are mixed with the particles beforehand in such a manner that a prescribed amount of the component is added at once or in portions. Thereafter, the remaining two or one component is mixed in such a manner that a prescribed amount of the component is added at once or in portions, and thereafter the reaction is performed.

(s5d) The monomer having an ethylenically unsaturated group and a polar functional group in the same molecule, the organic peroxide and the organic solvent are admixed with the particles one after another in any order, and thereafter the materials are reacted.

(p6) The polyolefin particles are brought to a condition substantially ready for the reaction by heating or the like.

Thereafter, the polyolefin particles are subjected to the following step (s6a), (s6b) or (s6c):

(s6a) An organic solvent solution of the monomer having an ethylenically unsaturated group and a polar functional group in the same molecule, and an organic solvent solution of the organic peroxide are supplied to the particles simultaneously and continuously at a low rate, and the materials are reacted.

(s6b) An organic solvent solution of the monomer having an ethylenically unsaturated group and a polar functional group in the same molecule, and an organic solvent solution of the organic peroxide are supplied to the particles one after the other continuously at a low rate, and the materials are reacted.

(s6c) One of an organic solvent solution of the monomer having an ethylenically unsaturated group and a polar functional group in the same molecule, and an organic solvent solution of the organic peroxide is supplied first to the particles continuously at a low rate. During this supply of one of these organic solvent solutions, the other organic solvent solution starts being supplied at a low rate. Thereafter, the reaction is performed while continuously supplying both solutions.

(p7) The polyolefin particles, the organic peroxide and the organic solvent are mixed together to give a mixture. While being heated, the mixture is brought into contact with a gas of the monomer having an ethylenically unsaturated group and a polar functional group in the same molecule, and the materials are reacted.

In a preferred embodiment of the invention, the contact takes place in the order and manner described in (p6). In the step (s6a), (s6b) or (s6c), there is no limitation on the duration of time required for the low-rate supply of the organic solvent solution of the monomer having an ethylenically unsaturated group and a polar functional group in the same molecule, and the organic solvent solution of the organic peroxide. The time may be 1.5 times to 100 times, or preferably 2.0 times to 50 times the decomposition half life of the organic peroxide at the temperature at which the reaction is performed.

The grafting reaction is performed in a range of temperatures at which the polyolefin particles substantially maintain the solid particle shape. That is, the modification reaction in the invention is performed at a temperature which does not cause the polyolefin particles to melt and fuse to one another. The temperatures at which the modification can be performed while satisfying such a condition generally vary depending on the types of the polyolefins. In general, a preferred range of temperatures is $(Tm-10)°$ C. to $(Tm-30)°$ C. wherein Tm is the melting point of the polyolefin resin constituting the polyolefin particles, measured by differential scanning thermal analysis at a heatup rate of 10° C./min. Such a preferred range of temperatures may be determined beforehand by experiments.

Some example upper limit temperatures of the modification of the polyolefin resins constituting the polyolefin particles will be described below. The upper limit modification temperature is about 200° C. for polyolefin particles based on poly-4-methylpentene-1 (melting point measured by differential scanning thermal analysis at a heatup rate of 10° C./min: 220 to 230° C.). The upper limit is about 150° C. for polyolefin particles based on polypropylene (melting point measured by differential scanning thermal analysis at a heatup rate of 10° C./min: about 160° C.). The upper limit is about 115° C. for polyolefin particles based on high-density polyethylene (melting point measured by differential scanning thermal analysis at a heatup rate of 10° C./min: 125 to 135° C.). The upper limit modification temperature is about 90° C. for polyolefin particles based on low-density polyethylene (melting point measured by differential scanning thermal analysis at a heatup rate of 10° C./min: 100 to 120° C.).

Preferably, the temperature of the grafting reaction is as high as possible while satisfying the above conditions to ensure that the monomer having an ethylenically unsaturated group and a polar functional group in the same molecule, the organic peroxide and the radical generated by the thermal decomposition of the organic peroxide will efficiently diffuse to the inside of the polyolefin particles and impregnate the polyolefin particles uniformly. From this viewpoint, it is preferable that the grafting reaction temperature be not less than the boiling point of the organic solvent used as the reaction solvent.

Specifically, the reaction temperature is preferably not less than the boiling point of an organic solvent whose boiling point at atmospheric pressure is lower than $(Tm-10)°$ C. wherein Tm is the melting point of the polyolefin resin constituting the polyolefin particles, measured by differential scanning thermal analysis at a heatup rate of 10° C./min.

Known additives may be used while still achieving the object of the invention. Examples of such additives include antioxidants such as hindered phenol compounds, process stabilizers, heat stabilizers, anti-thermal aging agents, weathering stabilizers, antistatic agents, antislip agents, antiblocking agents, antifogging agents, lubricants, pigments, dyes, nucleating agents, plasticizers, hydrochloric acid absorbents, flame retardants, anti-blooming agents, radical scavengers represented by nitroxy radicals of piperidines and the like, known softeners, tackifiers, processing aids, adhesion improvers, and fillers such as carbon fibers, glass fibers and whiskers. Small amounts of other high-molecular compounds may be blended without departing from the spirit of the present invention.

The grafting reaction may be performed using any type of an apparatus without limitation as long as the apparatus can perform mixing and heating of the polyolefin particles. For example, the reactor may be a vertical or horizontal reactor. Specific examples include fluidized bed reactors, moving bed reactors, loop reactors, horizontal reactors equipped with a stirring blade, vertical reactors equipped with a stirring blade, and rotary drums. Further, multiple screw, rotational and revolutionary mixers such as planetary mixers, kneaders, paddle dryers, Henschel mixers, static mixers, twin shell blenders, tumbling mixers and Nauta mixers may also be used as the "apparatuses which can perform mixing and heating of the polyolefin particles".

In order to prevent the loss of the organic solvent by evaporation during the reaction, it is preferable that the reaction take place in a tightly closed condition. In this regard, the grafting reaction is preferably performed in an autoclave. Alternatively to being airtight, the reaction may be performed while flowing an inert gas such as nitrogen that is supplied to the reaction system in order to control the occurrence of side reactions. In this case, the flow rate of the inert gas is preferably the minimum rate required to prevent side reactions. The vapor of the solvent evaporated during the reaction may be captured, condensed by cooling, recovered and returned back to the reaction system.

The reaction time of the grafting reaction may be selected appropriately in light of the conditions such as the reaction temperature, and the decomposition half life of the organic peroxide used. The reaction time is usually 3 to 10 times, or preferably 4 to 6 times as great as the decomposition half life of the organic peroxide at the reaction temperature, and is specifically usually 1/60 to 20 hours, and preferably 0.5 to 15 hours.

(Use Applications of Modified Polyolefin Particles)

The modified polyolefin particles obtained according to the present invention may be suitably used in, for example, filler-reinforced resin compositions, polymer alloy compatibilizers, adhesives, adhesive layers in stacks, varnishes, aqueous dispersions, and coating materials such as powder coatings.

Filler-Reinforced Resin Compositions and Polymer Alloy Compatibilizers

Examples of the filler-reinforced resin compositions include compositions reinforced with inorganic fillers, for example, silica, diatomaceous earth, alumina, titanium oxide, magnesium oxide, pumice powder, pumice balloon, aluminum hydroxide, magnesium hydroxide, basic magnesium carbonate, dolomite, calcium sulfate, calcium titanate, barium sulfate, calcium sulfite, talc, clay, mica, asbestos, glass fibers, glass flakes, glass beads, calcium silicate, montmorillonite, bentonite, boron fibers, carbon fibers, carbon black, carbon nanofibers, aluminum powder and molybdenum sulfide, compositions reinforced with chemically bonded composites of the above inorganic fillers and organic substances, and compositions reinforced with organic fillers, for example, fibers such as wholly aromatic polyamide fibers, aliphatic polyamide fibers, polyester fibers and cellulose fibers, or fine dispersions of organic materials such as liquid crystal polyesters and polyamides. Examples further include compositions reinforced with fibers or powders obtained by decomposition of plants. That is, the filler-reinforced resin compositions include the modified polyolefin particles obtained by the present invention, and a filler such as any of the inorganic fillers and/or the organic fillers described above.

A particularly effective filler in the filler-reinforced resin composition is carbon fibers. The carbon fibers may be any of known various carbon fibers. Specific examples of the carbon fibers include polyacrylonitrile-based fibers, rayon-based fibers, pitch-based fibers, polyvinyl alcohol-based fibers, regenerated cellulose-based fibers and pitch-based fibers produced from mesophase pitches.

The fiber diameter of the carbon fibers is preferably 3 to 30 μm, and more preferably 4 to 10 μm. If the fiber diameter is excessively small, the fibers are easily broken and the productivity of reinforcing fiber strands may be deteriorated at times. Further, such excessive thinness requires that a large number of fibers are tied in the continuous production of pellets and thus leads to poor productivity due to the need of complicated operations to join the fiber strands. In the case where the pellet length is prescribed, excessively thick fibers will have a low aspect ratio and sometimes fail to attain sufficient reinforcing effects. The aspect ratio is preferably 5 to 6000. An excessively low aspect ratio may lead to a decrease in strength, and an excessively high aspect ratio may result in poor forming properties. The aspect ratio of the carbon fibers may be determined from the average fiber diameter and the average fiber length using the ratio: average fiber length/average fiber diameter.

The raw material of carbon continuous fibers is continuous fiber strands. Usually, the average fiber diameter thereof is 3 to 30 μm, and the number of filaments bundled together is 500 to 24,000 filaments. Preferably, the average fiber diameter is 4 to 10 μm, and the number of filaments is 6,000 to 15,000 filaments.

Alternatively, the carbon fibers may be chopped strands. The length of the chopped strands is usually 1 to 20 mm, and the fiber diameter is about 3 to 30 μm, and preferably 4 to 10 μm.

The fiber length of the carbon fibers constituting the filler-reinforced resin composition is usually 0.05 to 200 mm, preferably 0.2 to 50 mm, and more preferably 4 to 20 mm.

The average aspect ratio (fiber length/fiber diameter) is usually 5 to 6000, preferably 30 to 3000, and more preferably 100 to 2000.

The carbon fibers are preferably laid parallel to one another with a substantially equal length, in particular, a length of 2 to 200 mm, or preferably 4 to 20 mm.

The surface of the carbon fibers is preferably treated by surface treatment such as oxidation etching or coating operation. Examples of the oxidation etching treatments include air oxidation treatment, oxygen treatment, oxidizing gas treatment, ozone treatment, corona treatment, flame treatment, (atmospheric pressure) plasma treatment, and treatment with an oxidizing liquid (nitric acid, aqueous alkali metal hypochlorite salt solution, potassium dichromate-sulfuric acid, or potassium permanganate-sulfuric acid). Some example substances for coating the carbon fibers are carbon, silicon carbide, silicon dioxide, silicon, plasma monomer, ferrocene and ferric chloride.

The "polymer alloy compatibilizers" which include the modified polyolefin particles of the invention may be suitably used in, for example, polymer alloys including (1) various engineering plastics such as polystyrenes, ethylene.vinyl alcohol copolymers, ionomer resins, polyurethanes, polyamides, polyesters, polyphenylene ethers, polycarbonates, polyacetals, polyphenylene sulfides, polysulfones, polyether ketones, polyether ether ketones and polyimides, (2) those polyolefins that are mentioned hereinabove in the section of "Polyolefin resins"; and (3) various elastomers such as nitrile rubbers, butadiene rubbers, chloroprene rubbers, butyl rubbers, isoprene rubbers, styrene-isoprene-styrene block copolymers, styrene-butadiene-styrene block copolymers and hydrogenated styrene-butadiene-styrene block copolymers. Further, the modified polyolefin particles of the invention are also suitably used as a compatibilizer in a reinforced resin including at least one selected from (1) to (3) and at least one filler selected from the aforementioned fillers such as glass fibers and carbon fibers.

These filler-reinforced resin compositions and various polymer alloys may be shaped by any known methods. Specifically, such shaped articles may be produced by methods such as air-cooled blown film extrusion, two-stage air-cooled blown film extrusion, high-speed blown film extrusion, T-die film extrusion, water-cooled blown film extrusion, pipe extrusion, profile extrusion, wire coating, extrusion into filaments or the like, injection molding, blow molding, press molding, stamping molding and calendering.

Where necessary, the shaped articles obtained may be stretched. For example, an extruded sheet or an extruded film (unstretched) may be stretched by a tenter method (vertical and horizontal stretching, horizontal and vertical stretching), a simultaneous biaxial stretching method or a uniaxial stretching method, to give a stretched film.

In the filler-reinforced resin composition, the filler preferably retains its shape during the production and shaping of the filler-reinforced resin composition and remains as such in the shaped article. In the case of, for example, carbon fibers, the weight average fiber length after shaping is usually not less than 0.01 mm, preferably not less than 0.1 mm, and more preferably not less than 1 mm, in which case enhancements in properties such as rigidity, impact resistance and durability may be obtained.

Shaped articles obtained by the above methods are used in various applications ranging from household products such as daily necessities and recreational items to general commerce applications and industrial items. Examples include home appliance material parts, communication equipment parts, electric components, electronic components, automotive parts, other vehicle parts, marine vessels, aircraft materials, mechanical parts, building material-related members, civil engineering members, agricultural materials, electric tool parts, food containers, films, sheets and fibers.

Specific examples of the automotive parts include front doors, wheel caps, gasoline tanks, seats (pads, skin materials, etc.), belts, ceilings, convertible tops, armrests, door trims, rear package trays, carpets, mats, sun visors, wheel covers, tires, mattress covers, air bags, insulating materials, hand straps, hand strap bands, wire coating materials, electrical insulating materials, paints, coating materials, overlay materials, flooring materials, corner walls, deck panels, covers, plywoods, ceiling boards, partition plates, sidewalls, carpets, wallpapers, wall coverings, exterior materials, interior materials, roofing materials, soundproof boards, thermal insulation boards and window materials.

Specific examples of the home appliance material parts, communication equipment parts, electric components and electronic components include office supplies and OA equipment such as printers, personal computers, word processors, keyboards, PDAs (portable digital assistances), headphone stereos, cellphones, telephones, facsimiles, copiers, ECRs (electronic cash registers), calculators, electronic organizers, electronic dictionaries, cards, holders and stationery; home appliances such as washing machines, refrigerators, vacuum cleaners, microwave ovens, lighting equipment, game machines, clothes irons and Japanese kotatsu (electric heater tables); AV equipment such as TV, VTR, video cameras, radio cassette recorders, tape recorders, mini disks, CD players, speakers and liquid crystal displays; connectors, relays, condensers, switches, printed circuit boards, coil bobbins, semiconductor sealing materials, electric wires, cables, transformers, deflection yokes, distribution boards and timepieces.

Specific examples of the daily necessities include life and sporting goods such as garments, curtains, sheets, plywoods, synthetic fiber boards, carpets, entrance mats, seats, buckets, hoses, containers, eyeglasses, bags, cases, goggles, skis, rackets, tents and musical instruments.

Adhesives and Adhesive Layers in Stacks

The modified polyolefin particles of the invention, when used as adhesives, exhibit high adhesion with respect to various substances, for example, resins, specifically, various engineering plastics such as polystyrenes, ethylene vinyl alcohol copolymers, ionomer resins, polyurethanes, polyamides, polyesters, polyphenylene ethers, polycarbonates, polyacetals, polyphenylene sulfides, polysulfones, polyether ketones, polyether ether ketones and polyimides, and various elastomers such as nitrile rubbers, butadiene rubbers, chloroprene rubbers, butyl rubbers, isoprene rubbers, styrene-isoprene-styrene block copolymers, styrene-butadiene-styrene block copolymers and hydrogenated styrene-butadiene-styrene block copolymers, metals such as aluminum, iron, nickel and copper, and fabrics such as paper, cotton and chemical fibers.

The modified polyolefin particles of the invention may be used singly as an adhesive. More preferably, the modified polyolefin particles are used as a thermoplastic resin composition which further includes a native polyolefin. In this case, the native polyolefin is suitably one mentioned hereinabove in the section of "Polyolefin resins". Further, the composition may contain known additives such as antioxidants, weathering stabilizers, antistatic agents, ultraviolet absorbers, nucleating agents, flame retardants and foaming agents as additional components.

Such a thermoplastic resin composition which includes the modified polyolefin particles and a native polyolefin may be produced by a known method, for example, by any of the following methods.

(1) A native polyolefin, the modified polyolefin particles of the invention and optionally other additive components are mechanically blended together with use of a device such as an extruder or a kneader.

(2) A native polyolefin, the modified polyolefin particles of the invention and optionally other additive components are dissolved in an appropriate good solvent (for example, a hydrocarbon solvent such as hexane, heptane, decane, cyclohexane, benzene, toluene or xylene), and thereafter the solvent is removed.

(3) A native polyolefin, the modified polyolefin particles of the invention and optionally other additive components are each dissolved in an appropriate good solvent, separately. The resultant solutions are mixed together, and thereafter the solvent is removed.

(4) The methods (1) to (3) are combined.

When the modified polyolefin particles of the invention are used as an adhesive layer in a stack, the stack is preferably one which includes, in the order named, a layer (hereinafter, also written as "substrate") including a polyolefin resin, preferably the polyolefin described hereinabove in the section of "Polyolefin resins", the adhesive layer, and a layer including a polar resin.

The modified polyolefin particles of the invention may be used singly as an adhesive layer in a stack. More preferably, the modified polyolefin particles are used as a thermoplastic resin composition which further includes a native polyolefin. In this case, the native polyolefin is suitably one mentioned hereinabove in the section of "Polyolefin resins". Further, the composition may contain known additives such as antioxidants, weathering stabilizers, antistatic agents, ultraviolet absorbers, nucleating agents, flame retardants and foaming agents as additional components.

Such a thermoplastic resin composition which includes the modified polyolefin particles and a native polyolefin may be produced by a known method, for example, by any of the methods (1) to (4) described above.

The substrate is usually a sheet or a film.

The thickness of the substrate may be selected appropriately in accordance with factors such as the material of the substrate, the shape and the purpose of use. To ensure that the substrate exhibits appropriate rigidity, the thickness is preferably not less than 0.01 mm, and more preferably not less than 0.03 mm. For reasons such as easy handling, the thickness of the substrate is preferably not more than 10 mm, and more preferably not more than 2 mm.

To ensure sufficient bonding performance, the thickness of the adhesive layer including the adhesive of the invention is preferably not less than 0.001 mm, and more preferably not less than 0.003 mm. Excessively thick adhesive layers are not as effective and are costly. Thus, the thickness of the adhesive layer is preferably not more than 0.3 mm, and more preferably not more than 0.1 mm.

Examples of the polar resins for forming the polar resin layers include ethylene.vinyl alcohol copolymer (EVOH), polyamides such as polyamide-6, polyamide-66 and polyamide 6T, and polyesters such as polyethylene terephthalate and polybutylene terephthalate.

The thickness of the polar resin layer is preferably not less than 0.001 mm, and more preferably not less than 0.003 mm. The thickness of the polar resin layer is preferably not more than 0.3 mm, and more preferably not more than 0.1 mm.

The stack may be produced by a known method without limitation. Specifically, the stacks may be obtained by such methods as, for example, coextrusion injection method and hot lamination method. The shapes of the stacks are not particularly limited. Some example shapes are bottles, cups, tubes and sheets. Specific examples of the use applications of the stacks include bottles for such products as shampoos and detergents, bottles for seasonings such as cooking oil and soy sauce, bottles for beverages such as mineral water and juice, heat-resistant food containers such as lunch boxes and bowls for Japanese steamed egg custard, tableware such as dishes and chopsticks, other various food containers, various packaging films and packaging bags such as standard bags, sugar bags, oil product packaging bags, aqueous product packaging bags, food packages (sterilizable at high temperatures) and retort pouches, and agricultural materials.

Varnishes and Aqueous Dispersions

Varnishes

The modified polyolefin particles of the invention may be used as a varnish. The varnish includes the modified polyolefin particles and a solvent. Examples of the solvents include aromatic hydrocarbon solvents such as benzene, toluene and xylene, aliphatic hydrocarbon solvents such as pentane, hexane, heptane, octane, nonane and decane, alicyclic hydrocarbon solvents such as cyclohexane, methylcyclohexane and decahydronaphthalene, and chlorinated hydrocarbon solvents such as chlorobenzene, dichlorobenzene, trichlorobenzene, methylene chloride, chloroform, carbon tetrachloride and tetrachloroethylene.

The solvents may be used singly, or two or more may be used in combination.

The solid concentration in the varnish is usually 1 to 99 wt %, and preferably 10 to 90 wt %.

Where necessary, a mixture of the above solvent and an appropriate amount of a poor solvent may be used. Examples of the poor solvents include alcohol solvents such as methanol, ethanol, n-propanol, iso-propanol, n-butanol, sec-butanol and tert-butanol, ketone solvents such as acetone, methyl ethyl ketone and methyl isobutyl ketone, ester solvents such as ethyl acetate and dimethyl phthalate, and ether solvents such as dimethyl ether, diethyl ether, di-n-amyl ether, tetrahydrofuran and dioxyanisole. The amount of the poor solvent may be, for example, 0.1 to 100 parts by weight per 100 parts by weight of the above solvent.

Aqueous Dispersions

The modified polyolefin particles of the invention may be used as an aqueous dispersion. In this case, it is particularly preferable that the monomer grafted to the modified polyolefin particles be a monomer having an ethylenically unsaturated group and a carboxyl group in the same molecule. Such an aqueous dispersion may be produced by a known method, for example, by neutralizing the carboxyl groups with a neutralizer as required, and dispersing the particles into water. Examples of the neutralizers include ammonia, monomethylamine, monoethylamine, dimethylamine, trimethylamine, triethylamine, ethyldimethylamine, sodium hydroxide and potassium hydroxide.

Where necessary, it is possible to use a nonionic surfactant, an anionic surfactant, a cationic surfactant, or an anti-foaming agent. As an optional component, any of the solvents mentioned hereinabove in the section of "Varnishes" may also be used. That is, the aqueous dispersion includes the modified polyolefin particles or a salt of the modified polyolefin particles with the neutralizer, and water, and may optionally further include, for example, a surfactant such as a nonionic surfactant, an anionic surfactant or a cationic surfactant, an anti-foaming agent, and any of the solvents described in the section of "Varnishes".

The varnishes or the aqueous dispersions may be suitably used as binders or dispersing agents for additives such as anti-wear agents, dyeing auxiliaries and pigments for coatings and inks used in various fields such as automobiles, electric and electronic components, buildings and packaging materials, antiblocking agents, antirust coating additives, primers, coating agents and adhesives, floor polishes, car waxes, and also as sizing agents for glass fibers or carbon fibers, paper softeners, paper coating additives, mold release agents for urethane foaming and rubber molding, and toner release agents.

EXAMPLES

The present invention will be described based on Examples hereinbelow. However, the scope of the invention is not limited to such Examples.

In Examples and Comparative Examples below, analysis methods were performed in the following manners.

(1) Number of 0.05-0.2 µm Holes on Surface of Particles

With use of scanning electron microscope JSM-6380 manufactured by JEOL Ltd., three portions of the surface of the particles which looked to have the largest number of 0.05 µm-0.2 µm holes in a 1 µm square region were observed in a 10 µm×13 µm field of view with 10000 times magnification, and the largest number of such holes was determined.

The individual three portions were each analyzed in the following manner. The surface of the particles was observed on scanning electron microscope JSM-6380 in a 10 µm×13 µm field of view with 10000 times magnification. Three portions of the particle surface which looked to have the largest number of 0.05 µm–0.2 µm holes in a 1 µm square region were selected, and the numbers of such holes were determined.

(2) Measurement of Content of Aliphatic Alcohol with 150 or Less Molecular Weight and Content of Aromatic Ring-Containing Compound with 250 or Less Molecular Weight A sample weighing 20 mg (or 10 mg) was placed into a 20 ml vial bottle, which was then tightly closed. The sample was heated at 190° C. for 30 minutes with use of a headspace sampler, and the headspace gas was analyzed by gas chromatography-mass spectroscopy.

For example, in the measurement of the content of t-butyl alcohol (t-BuOH) as an aliphatic alcohol with 150 or less molecular weight, the amount of the alcohol generated was determined by an absolute calibration curve method with respect to the area of a peak at a retention time of 6.54 minutes in an extracted-ion chromatogram obtained using a cleavage ion (m/z 59) characteristic of the mass spectrum of t-butyl alcohol.

In the case of isopropyl alcohol (IPA), the amount was determined by an absolute calibration curve method with respect to the area of a peak at a retention time of 6.9 minutes.

In the measurement of the content of benzene as an aromatic ring-containing compound with 250 or less molecular weight, the amount of the compound generated was determined by an absolute calibration curve method with respect to the area of a peak at a retention time of 7.5 minutes.

(3) Intrinsic Viscosity ([η])

A sample was dissolved in decal in to give a dilute solution. With an automatic viscosity meter equipped with a modified Ubbelohde viscometer, the specific viscosity at 135° C. was measured and the intrinsic viscosity was calculated.

(4) Removal of Ungrafted Unsaturated Carboxylic Acid

The following operation was performed to completely remove unreacted unsaturated carboxylic acid from modified polyolefin particles after the reaction. Approximately 50 ml of xylene was added to 1 g of the modified polyolefin particles. The particles were dissolved by being heated in a flask equipped with a reflux condenser. Next, the solution was cooled to room temperature. Acetone was added to precipitate the modified polyolefin, which was recovered by filtration and dried.

(5) Amount of Grafting by Graft Monomer

The amount of grafting by unsaturated carboxylic acid as a graft monomer was determined in the following manner.

The modified polyolefin cleaned of ungrafted unsaturated carboxylic acid was hot pressed at 250° C. to form a film. An infrared absorption spectrum of this film was measured, and the amount of grafting by the unsaturated carboxylic acid was determined based on the absorption at near 1790 $cm^{-1}$ or near 1860 $cm^{-1}$. The value obtained was converted into a $^1$H-NMR value using a previously prepared calibration curve representing a correlation between $^1$H-NMR values and infrared absorption spectroscopy values.

When the graft monomer was other than unsaturated carboxylic acid, the amount of grafting was measured by $^1$H-NMR of the modified polyolefin cleaned of ungrafted monomer.

(6) Average Particle Size

For sample polyolefin particles and sample modified polyolefin particles expected to have an average particle size of less than 1000 μm, the average particle size was determined by a laser diffraction scattering method using ethanol as a dispersion medium. When the expected average particle size was 1000 μm or above, the polyolefin particles were mixed with a very small amount of carbon black as an antistatic agent and were classified using eight sieves having mesh opening sizes of 100 μm, 180 μm, 355 μm, 850 μm, 1180 μm, 1400 μm, 1700 μm and 2800 μm. Based on the results, the median diameter was determined as the average particle size by a common method.

(7) Melting Point (Tm)

The melting point (Tm) of polyolefin particles was determined by differential scanning thermal analysis at a heatup rate of 10° C./min. Specifically, sample particles were packed into an aluminum pan and heated to 200° C. at a rate of 10° C./min, and the peak top temperature of a melting peak having ΔH of 1 J/g or above that was recorded during the heating was taken as the melting point.

(8) Melt Flow Rate (MFR)

The melt flow rate (MFR) of polyolefin particles was measured at 230° C. under 2.16 kg load in accordance with ASTM D1238.

For particles of a copolymer of 4-methylpentene-1 and decene-1, the measurement was performed at 260° C. and under 5 kg load.

(9) Abbreviations of Organic Peroxides

The abbreviations of organic peroxides used in Examples and Comparative Examples indicate the following compounds or products.

PBI: t-butyl peroxyisopropyl monocarbonate (NOF CORPORATION, PERBUTYL I)

PBZ: t-butyl peroxybenzoate (NOF CORPORATION, PERBUTYL Z)

NP-BMT: mixture of benzoyl peroxide, benzoyl-m-methylbenzoyl peroxide and m-toluoyl peroxide (theoretical active oxygen content=6.05%, NOF CORPORATION, NYPER (registered trademark) BMT-K40, 40% xylene solution)

(10) Evaluation of Oxidation Resistance of Modified Polyolefin Particles to which Antioxidant was Adsorbed Modified polyolefin particles weighing 1 g were added to a solution of 1 g of pentaerythritol tetrakis(3-(3,5-di-t-butyl-4-hydroxyphenyl) propionate) (IRGANOX 1010 manufactured by BASF Corporation) as an antioxidant in 9 g of tetrahydrofuran. The mixture was allowed to stand at room temperature for 24 hours, and thereby the graft-modified polymer particles were impregnated with the antioxidant. Next, the mixture was filtered through a G2 glass filter, and the modified polyolefin particles were dried at room temperature. Next, 0.5 g of the resultant modified polyolefin particles were added to 5 g of methanol, and the mixture was stirred at room temperature for 10 minutes to remove the free antioxidant adhering to the surface of the modified polyolefin particles. In an oxygen atmosphere, the oxidation induction time of the antioxidant-adsorbed modified polyolefin particles was measured at 200° C. when the modified polyolefin particles were a propylene homopolymer or a propylene.ethylene random copolymer, or at 250° C. when the modified polyolefin particles were a random copolymer of 4-methylpentene-1 and decene-1.

The present inventors consider that a long oxidation induction time (that is, high oxidation resistance) measured in Examples is equivalent to sufficient impregnation and adsorption of the antioxidant to the holes.

(11) Measurement of Gel Content

Approximately 0.3 g of the modified polyolefin was added to a container made of a 330-mesh metal gauge, and 100 ml of xylene was added. The mixture was heated under reflux for 2 hours. The gel retained in the metal gauge was dried with a vacuum dryer at 120° C. for 12 hours, and the weight thereof was measured. The ratio (percentage) of the weight of the gel to the initial weight of the sample was determined as the gel content.

(12) Complex Viscosity (|η*|)

A test piece, in the form of a disk plate, which was 2 mm in thickness and 25 mm in diameter was formed by press molding. With use of viscoelastometer Physica MCR301 manufactured by Anton Paar, the measurement was performed with 1% strain at an angular frequency in the range of 100 rad/s to 0.1 rad/s. The ratio of the complex viscosity at 0.1 rad/s to that at 10 rad/s was determined.

Here, the measurement temperature was 260° C. in Example 7 and Comparative Example 4 which involved particles of a random copolymer of 4-methylpentene-1 and decene-1, and was 170° C. in other Examples and Comparative Examples.

Example 1

A 1 L autoclave was loaded with 100 parts by weight of particles of a propylene-ethylene random copolymer having a MFR of 0.4 (g/10 min), a melting point of 145° C. and an average particle size of 250 μm. While performing stirring in a nitrogen atmosphere, the particles were heated in an oil bath at 120° C. Under this condition, a solution of 7.5 parts by weight of maleic anhydride in 26 parts by weight of toluene, and a solution of 3.4 parts by weight of t-butyl peroxyisopropyl monocarbonate (NOF CORPORATION, PERBUTYL I) as an organic peroxide in 3.5 parts by weight of toluene were added dropwise concurrently to the autoclave. The time required for the dropwise addition was 4 hours for the toluene solution of maleic anhydride and 1 hour and 40 minutes for the toluene solution of t-butyl peroxyisopropyl monocarbonate. After the completion of the dropwise addition of the toluene solution of maleic anhydride, heating and stirring were continued for 1 hour, and then the reaction was deemed to complete. During the reaction, the autoclave was tightly closed. After the completion of the reaction, the system was cooled and 280 parts by weight of acetone was added thereto. The autoclave was tightly closed again, and the system was heated in an oil bath at 100° C. for 1 hour while performing stirring. After the completion of the heating, the system was cooled and filtered. These operations were repeated 3 times in total, and the product was vacuum dried at 60° C. for 5 hours. Table 1-1 describes the amounts of the raw materials and the grafting conditions.

In Table 1-1, [*1] in the row of reaction time means that the polypropylene homopolymer alone was fed to the reactor first and heated to 120° C., and thereafter the toluene solution of maleic anhydride was dropped over a period of 4 hours concurrently with the toluene solution of the organic peroxide over a period of 1 hour and 40 minutes, and the reaction was further performed for 1 hour.

The properties of the maleic anhydride-modified polypropylene obtained are described in Table 2-1.

Example 2

The procedures in Example 1 were repeated, except that 3.4 parts by weight of t-butyl peroxyisopropyl monocarbonate (NOF CORPORATION, PERBUTYL I) was replaced by 3.7 parts by weight of t-butyl peroxybenzoate (NOF CORPORATION, PERBUTYL Z) and the heating temperature was changed to 125° C. Table 1-1 describes the amounts of the raw materials and the grafting conditions.

The properties of the maleic anhydride-modified polypropylene obtained are described in Table 2-1.

Comparative Example 1

The procedures in Example 1 were repeated, except that the amount of t-butyl peroxyisopropyl monocarbonate was changed from 3.4 parts by weight to 6.1 parts by weight. Table 1-3 describes the amounts of the raw materials and the grafting conditions.

The properties of the maleic anhydride-modified polypropylene obtained are described in Table 2-3.

Comparative Example 2

A 1 L autoclave was loaded with 100 parts by weight of the same particles of a propylene-ethylene random copolymer as used in Example 1. While performing stirring at room temperature in a nitrogen atmosphere, a solution of 5 parts by weight of maleic anhydride in 17 parts by weight of toluene, and 11 parts by weight of a 40% xylene solution of an organic peroxide mixture of benzoyl peroxide, benzoyl-m-methylbenzoyl peroxide and m-toluoyl peroxide (NOF CORPORATION, trade name NYPER (registered trademark) BMT-K40) were added dropwise. The mixture was stirred for 30 minutes and thereafter the reaction was performed by heating the mixture in an oil bath at 100° C. for 4 hours. During the reaction, the autoclave was tightly closed. After the completion of the reaction, the system was cooled and the contents in the autoclave were withdrawn. Acetone was added to adjust the total volume to 1 L, and the mixture was stirred at room temperature for 10 minutes and was filtered. These operations were repeated 4 times in total, and the product was vacuum dried at 60° C. for 5 hours. Table 1-3 describes the amounts of the raw materials and the grafting conditions. In Table 1-3, [*2] in the row of amount of toluene (to dissolve peroxide) means that because this Comparative Example used xylene, instead of toluene, as the solvent for supplying the organic peroxides, the value described in the row of amount of toluene (to dissolve peroxide) indicates the amount of xylene present in the xylene solution.

The properties of the maleic anhydride-modified polypropylene obtained are described in Table 2-3.

Example 3

A 20 ml-volume pressure resistant vessel was loaded with 100 parts by weight of the same particles of a propylene-ethylene random copolymer as used in Example 1, 10 parts by weight of maleic anhydride and 3.2 parts by weight of t-butyl peroxyisopropyl monocarbonate (NOF CORPORATION, PERBUTYL I) as an organic peroxide. After the inside was purged with nitrogen, 8.7 parts by weight of toluene was added and the vessel was tightly closed. The reaction was performed by heating the mixture in an oil bath at 120° C. for 5 hours. After the completion of the reaction, the system was cooled and the contents in the pressure resistant vessel were withdrawn and were subjected to the same post treatment as in Example 1. Table 1-1 describes the amounts of the raw materials and the grafting conditions.

The properties of the maleic anhydride-modified polypropylene particles obtained are described in Table 2-1.

Example 4

A 2 L-volume planetary mixer (PLM-2 manufactured by INOUE MFG., INC.) was loaded with 100 parts by weight of particles of a propylene homopolymer having a MFR of 0.6 (g/10 min), a melting point of 160° C. and an average particle size of 380 μm. While performing stirring in a nitrogen atmosphere, the particles were heated in an oil bath at 125° C. Under this condition, a solution of 8.3 parts by weight of maleic anhydride in 35 parts by weight of toluene was added dropwise to the planetary mixer over a period of 4 hours. After 30 minutes from the start of the dropwise addition of the toluene solution of maleic anhydride, dropwise addition was started of a solution of 6.8 parts by weight of t-butyl peroxyisopropyl monocarbonate (NOF CORPORATION, PERBUTYL I) as an organic peroxide in 3.5 parts by weight of toluene, and the total volume thereof was dropped in 2 hours and 40 minutes. After the completion of the dropwise addition of the toluene solution of maleic anhydride, heating and stirring were continued for 1 hour, and then the reaction was deemed to complete. During the reaction, the inside of the planetary mixer was constantly a nitrogen atmosphere. After the completion of the reaction, the system was cooled and the contents were withdrawn and were added to an autoclave. After 280 parts by weight of acetone was added, the autoclave was tightly closed. The system was heated in an oil bath at 100° C. for 1 hour while performing stirring. After the completion of the heating, the system was cooled and filtered. These operations were repeated 3 times in total, and the product was vacuum dried at 60° C. for 5 hours.

The properties of the maleic anhydride-modified polypropylene obtained are described in Table 2-2.

In Table 1-2, *3 in the row of reaction time means that the polypropylene homopolymer alone was fed to the reactor first and heated to 125° C., and thereafter the toluene solution of maleic anhydride was dropped over a period of 4 hours and, after 30 minutes from the start of the dropwise addition of maleic anhydride, the toluene solution of the peroxide was dropped in 2 hours and 40 minutes, and the reaction was further performed for 1 hour.

Example 5

A 2 L-volume planetary mixer (PLM-2 manufactured by INOUE MFG., INC.) was loaded with 100 parts by weight of the same particles as used in Example 4, specifically, particles of a propylene homopolymer having a MFR of 0.6 (g/10 min) and an average particle size of 380 μm. While performing stirring in a nitrogen atmosphere, the particles were heated in an oil bath at 140° C. Under this condition, a solution of 8.3 parts by weight of maleic anhydride in 35 parts by weight of toluene, and a solution of 6.8 parts by weight of t-butyl peroxyisopropyl monocarbonate (NOF CORPORATION, PERBUTYL I) as an organic peroxide in 3.5 parts by weight of toluene were added dropwise concurrently to the planetary mixer. The time required for the dropwise addition was 4 hours for the toluene solution of maleic anhydride and 2 hours and 40 minutes for the toluene solution of t-butyl peroxyisopropyl monocarbonate. After the completion of the dropwise addition of the toluene solution of maleic anhydride, heating and stirring were continued for 1 hour, and then the reaction was deemed to complete. During the reaction, the inside of the planetary mixer was constantly a nitrogen atmosphere. After the completion of the reaction, the system was cooled and the contents were withdrawn and were added to an autoclave. After 280 parts by weight of acetone was added, the autoclave was tightly closed. The system was heated in an oil bath at 100° C. for 1 hour while performing stirring. After the completion of the heating, the system was cooled and filtered. These operations were repeated 3 times in total, and the product was vacuum dried at 60° C. for 5 hours.

The properties of the maleic anhydride-modified polypropylene obtained are described in Table 2-2.

In Table 1-2, *4 in the row of reaction time means that the polypropylene homopolymer alone was fed to the reactor first and heated to 140° C., and thereafter the toluene solution of maleic anhydride was dropped over a period of 4 hours concurrently with the toluene solution of the peroxide over a period of 2 hours and 40 minutes, and the reaction was further performed for 1 hour.

Example 6

A 300 ml-volume glass vessel was loaded with 100 parts by weight of particles of a propylene homopolymer having a MFR of 2 (g/10 min), a melting point of 160° C. and an average particle size of 4 mm, a solution of 8.3 parts by weight of maleic anhydride in 35 parts by weight of toluene, and 6.8 parts by weight of t-butyl peroxyisopropyl monocarbonate (NOF CORPORATION, PERBUTYL I) as an organic peroxide. The vessel was purged with nitrogen, and the mixture was heated in an oil bath at 125° C. for 5 hours, thereby performing the reaction. During the reaction, the inside of the glass vessel was constantly a nitrogen atmosphere. After the completion of the reaction, the system was cooled and the contents were withdrawn and were combined with 280 parts by weight of acetone. The resultant mixture was stirred at room temperature for 10 minutes and was filtered. These operations were repeated 4 times in total, and the product was vacuum dried at 60° C. for 5 hours.

The properties of the maleic anhydride-modified polypropylene obtained are described in Table 2-2.

The propylene homopolymer particles used in this Example were pellets unlike the polymer particles used in other Examples.

Example 7

A 2 L-volume planetary mixer (PLM-2 manufactured by INOUE MFG., INC.) was loaded with 100 parts by weight of particles of a copolymer of 4-methylpentene-1 and decene-1 having a decene-1 unit content of 3 wt %, a MFR of 5 g/10 min, an average particle size of 380 μm and a melting point of 232° C., a solution of 5 parts by weight of maleic anhydride in 17 parts by weight of toluene, and 1.3 parts by weight of t-butyl peroxyisopropyl monocarbonate (NOF CORPORATION, PERBUTYL I) as a peroxide. The inside was purged with nitrogen, and the mixture was heated in an oil bath at 150° C. for 1 hour, thereby performing the reaction. After the completion of the reaction, the system was cooled and the contents in the planetary mixer were withdrawn. Acetone was added to adjust the total volume to 1 L, and the mixture was stirred at room temperature for 10 minutes and was filtered. These operations were repeated 4 times in total, and the product was vacuum dried at 60° C. for 5 hours.

The properties of the maleic anhydride-modified copolymer of 4-methylpentene-1 and decene-1 are described in Table 2-2.

Comparative Example 3

2 Parts by weight of maleic anhydride and 0.5 parts by weight of 2,5-dimethyl-2,5-di(t-butyl peroxy)hexane (NOF CORPORATION, PERHEXA 25B) as a peroxide were added to 100 parts by weight of the same particles as used in Example 1, specifically, particles of a propylene-ethylene random copolymer having a MFR of 0.4 (g/10 min), a melting point of 145° C. and an average particle size of 250 μm. The mixture was dry blended and was kneaded with a twin-screw extruder set at 230° C. to give a modified polyolefin.

The properties of the maleic anhydride-modified polypropylene obtained are described in Table 2-3.

Comparative Example 4

A 20 ml-volume pressure resistant vessel was loaded with 100 parts by weight of the same particles of a copolymer of 4-methylpentene-1 and decene-1 as used in Example 7, 5 parts by weight of maleic anhydride, and 3.1 parts by weight of t-butyl peroxyisopropyl monocarbonate (NOF CORPORATION, PERBUTYL I) as a peroxide. The inside was purged with nitrogen, and 17 parts by weight of toluene was added. The vessel was then tightly closed, and the mixture was heated in an oil bath at 125° C. for 5 hours, thereby performing the reaction. After the completion of the reaction, the system was cooled and the contents in the pressure resistant vessel were withdrawn and were subjected to the same post treatment as in Example 7.

The properties of the maleic anhydride-modified polypropylene obtained are described in Table 2-3.

TABLE 1-1

|  |  | Unit | Ex. 1 | Ex. 2 | Ex. 3 |
|---|---|---|---|---|---|
| Raw materials | Polyolefin | Parts by weight | 100 | 100 | 100 |
|  | Type | — | Propylene-ethylene random copolymer (melting point 145° C., average particle size 250 μm) | Propylene-ethylene random copolymer (melting point 145° C., average particle size 250 μm) | Propylene-ethylene random copolymer (melting point 145° C., average particle size 250 μm) |
|  | Graft monomer | Parts by weight | 7.5 | 7.5 | 10 |
|  | Type |  | Maleic anhydride | Maleic anhydride | Maleic anhydride |
|  | Peroxide | Parts by weight | 3.4 | 3.7 | 3.2 |
|  | Type | — | PBI | PBZ | PBI |
|  | Molecular weight of alkoxy radical moiety constituting the molecule | — | 73 and 103 | 73 | 73 and 103 |
|  | Molecular weight of aromatic hydrocarbon radical moiety constituting the molecule | — | — | 121 | — |
|  | (Number of moles of graft monomer) ÷ (Number of moles of peroxide) | — | 4 | 4 | 5.7 |
|  | Amount of toluene (to dissolve graft monomer) | Parts by weight | 26 | 26 | — |
|  | Amount of toluene (to dissolve peroxide) | Parts by weight | 3.5 | 3.5 | 8.7 |
| Grafting conditions | Reaction temperature | ° C. | 120 | 125 | 120 |
|  | Reaction time | hr | 5*[1] | 5*[1] | 5 |

*[1] The polypropylene homopolymer alone was fed to the reactor first and heated to 120° C., and thereafter the toluene solution of maleic anhydride was dropped over a period of 4 hours concurrently with the toluene solution of the peroxide over a period of 1 hour and 40 minutes, and the reaction was further performed for 1 hour.

TABLE 1-2

|  |  | Unit | Ex. 4 | Ex. 5 | Ex. 6 | Ex. 7 |
|---|---|---|---|---|---|---|
| Raw materials | Polyolefin | Parts by weight | 100 | 100 | 100 | 100 |
|  | Type | — | Propylene homopolymer (MFR = 0.6, melting point 160° C., average particle size = 380 μm) | Propylene homopolymer (MFR = 0.6, melting point 160° C., average particle size = 380 μm) | Propylene homopolymer (MFR = 2, melting point 160° C., average particle size = 4 mm) | 4-Methylpentene-1 decene-1 copolymer (melting point 232° C., average particle size 380 μm) |
|  | Graft monomer | Parts by weight | 8.3 | 8.3 | 8.3 | 5 |
|  | Type |  | Maleic anhydride | Maleic anhydride | Maleic anhydride | Maleic anhydride |
|  | Peroxide | Parts by weight | 6.8 | 6.8 | 6.8 | 1.3 |
|  | Type | — | PBI | PBI | PBI | PBI |
|  | Molecular weight of alkoxy radical moiety constituting the molecule | — | 73 and 103 | 73 and 103 | 73 and 103 | 73 and 103 |
|  | Molecular weight of aromatic hydrocarbon radical moiety constituting the molecule | — | — | — | — | — |
|  | (Number of moles of graft monomer) ÷ (Number of moles of peroxide) | — | 2.25 | 2.25 | 2.25 | 6.9 |
|  | Amount of toluene (to dissolve graft monomer) | Parts by weight | 35 | 35 | 35 | 4.4 |

TABLE 1-2-continued

|  |  | Unit | Ex. 4 | Ex. 5 | Ex. 6 | Ex. 7 |
|---|---|---|---|---|---|---|
|  | Amount of toluene (to dissolve peroxide) | Parts by weight | 3.5 | 3.5 | — | — |
| Grafting conditions | Reaction temperature | °C. | 125 | 140 | 125 | 150 |
|  | Reaction time | hr | 5*[3] | 5*[4] | 5 | 1 |

*[3] The polypropylene homopolymer alone was fed to the reactor first and heated to 125° C., and thereafter the toluene solution of maleic anhydride was dropped over a period of 4 hours and, after 30 minutes from the start of the dropwise addition of maleic anhydride, the toluene solution of the peroxide was dropped over a period of 2 hours and 40 minutes, and the reaction was further performed for 1 hour.

*[4] The polypropylene homopolymer alone was fed to the reactor first and heated to 140° C., and thereafter the toluene solution of maleic anhydride was dropped over a period of 4 hours concurrently with the toluene solution of the peroxide over a period of 2 hours and 40 minutes, and the reaction was further performed for 1 hour.

TABLE 1-3

|  |  | Unit | Comp. Ex. 1 | Comp. Ex. 2 | Comp. Ex. 3 | Comp. Ex. 4 |
|---|---|---|---|---|---|---|
| Raw materials | Polyolefin | Parts by weight | 100 | 100 | 100 | 100 |
|  | Type | — | Propylene-ethylene random copolymer (melting point 145° C., average particle size 250 μm) | Propylene-ethylene random copolymer (melting point 145° C., average particle size 250 μm) | Propylene-ethylene random copolymer (melting point 145° C., average particle size 250 μm) | 4-Methylpentene-1 decene-1 copolymer (melting point 232° C., average particle size 380 μm) |
|  | Graft monomer | Parts by weight | 7.5 | 5 | 2 | 5 |
|  | Type | — | Maleic anhydride | Maleic anhydride | Maleic anhydride | Maleic anhydride |
|  | Peroxide | Parts by weight | 6.1 | 4.5 | 0.5 | 3.1 |
|  | Type | — | PBI | NP-BMT | PH25B | PBI |
|  | Molecular weight of alkoxy radical moiety constituting the molecule | — | 73 and 103 | — | 73 and 144 | 73 and 103 |
|  | Molecular weight of aromatic hydrocarbon radical moiety constituting the molecule | — | — | 121 and 135 | — | — |
|  | (Number of moles of graft monomer) ÷ (Number of moles of peroxide) | — | 2.25 | 3 | 5.9*[5] | 3 |
|  | Amount of toluene (to dissolve graft monomer) | Parts by weight | 17 | 17 | — | 17 |
|  | Amount of toluene (to dissolve peroxide) | Parts by weight | 3.5 | 6.7*[2] | — | — |
| Grafting conditions | Reaction temperature | °C. | 120 | 100 | 180 | 125 |
|  | Reaction time | hr | 5*[1] | 4 | *[6] | 5 |

*[1] The polypropylene homopolymer alone was fed to the reactor first and heated to 120° C., and thereafter the toluene solution of maleic anhydride was dropped over a period of 4 hours concurrently with the toluene solution of the peroxide over a period of 1 hour and 40 minutes, and the reaction was further performed for 1 hour.

*[2] Peroxide sold as a xylene solution was used (11.2 parts by weight of a 40% xylene solution of a mixture of benzoyl peroxide, benzoyl-m-methylbenzoyl peroxide and m-toluoyl peroxide, trade name NYPER (registered trademark) BMT-K40 manufactured by NOF CORPORATION was used). Because this Comparative Example used xylene, instead of toluene, as the solvent for dissolving the peroxides, the value described in the row of "Amount of toluene (to dissolve peroxide)" indicates the amount of xylene present in the xylene solution.

*[5] Because 2,5-dimethyl-2,5-di-(t-butyl peroxy)hexane contains two peroxide bonds per molecule, the value indicated is twice the value of (Number of moles of graft monomer) ÷ (Number of moles of peroxide).

*[6] Kneaded with a twin-screw extruder.

TABLE 2-1

|  |  | Unit | Ex. 1 | Ex. 2 | Ex. 3 |
|---|---|---|---|---|---|
| Properties of acid-modified polyolefin particles | Amount of grafting (x) (converted to NMR) | wt % | 3.5 | 3.2 | 1.7 |
|  | [η] | dl/g | 0.65 | 0.64 | 1.21 |
|  | $\log_{10}([\eta]/dl \cdot g^{-1})$ | — | −0.19 | −0.19 | 0.08 |
|  | $\log_{10}([\eta]/dl \cdot g^{-1}) + 0.15x$ | — | 0.33 | 0.29 | 0.34 |
|  | Number of 0.05-0.2 μm holes in 1 μm square region (maximum numbers in three portions observed) | Holes | 10 | 15 | 11 |
|  |  | Holes | 10 | 12 | 9 |
|  |  | Holes | 6 | 10 | 8 |
|  | Average particle size | μm | 250 | 260 | 250 |
|  | t-BuOH | μg/g | 45 | 20 | 30 |
|  | IPA | μg/g | 1700 | — | 1600 |
|  | Benzene | μg/g | — | 13 | — |
|  | Gel content | wt % | 0.2 | 0.2 | 0 |
|  | $|\eta^*|$ (0.1 rad/sec) | Pa·sec | 240 | 230 | 21000 |
|  | $|\eta^*|$ (1 rad/sec) | Pa·sec | 200 | 190 | 9200 |

TABLE 2-1-continued

|  |  | Unit | Ex. 1 | Ex. 2 | Ex. 3 |
|---|---|---|---|---|---|
|  | $|\eta^*|$ (10 rad/sec) | Pa · sec | 170 | 170 | 3000 |
|  | $|\eta^*|$ (0.1 rad/sec) ÷ $|\eta^*|$ (10 rad/sec) | — | 1.4 | 1.4 | 7.0 |
|  | $1 + 0.07 \times (\log_{10}(|\eta^*| @ (1\ \text{rad/sec})/\text{Pa} \cdot \text{sec}))^{3.4}$ | — | 2.2 | 2.2 | 8.6 |
| Evaluation | Oxidation induction time (min) | min | 14 | 20 | 15 |

TABLE 2-2

|  |  | Unit | Ex. 4 | Ex. 5 | Ex. 6 | Ex. 7 |
|---|---|---|---|---|---|---|
| Properties of acid-modified polyolefin particles | Amount of grafting (x) (converted to NMR) | wt % | 3.2 | 4.0 | 1.9 | 1.1 |
|  | [η] | dl/g | 0.57 | 0.46 | 0.81 | 2.6 |
|  | $\log_{10}([\eta]/\text{dl} \cdot \text{g}^{-1})$ | — | −0.24 | −0.34 | −0.09 | 0.41 |
|  | $\log_{10}([\eta]/\text{dl} \cdot \text{g}^{-1}) + 0.15x$ | — | 0.24 | 0.26 | 0.19 | 0.58 |
|  | Number of 0.05-0.2 μm holes in 1 μm square region (maximum numbers in three portions observed) | Holes | 13 | 10 | 0 | 10 |
|  |  | Holes | 10 | 10 | 0 | 9 |
|  |  | Holes | 9 | 10 | 0 | 8 |
|  | Average particle size | μm | 380 | 380 | 4000 | 380 |
|  | t-BuOH | μg/g | 70 | 55 | 240 | 83 |
|  | IPA | μg/g | 1200 | 900 | 1400 | 1100 |
|  | Benzene | μg/g | — | — | — | — |
|  | Gel content | wt % | 0 | 0 | 0 | 0.6 |
|  | $|\eta^*|$ (0.1 rad/sec) | Pa · sec | — | — | — | 12200 |
|  | $|\eta^*|$ (1 rad/sec) | Pa · sec | — | — | — | 5890 |
|  | $|\eta^*|$ (10 rad/sec) | Pa · sec | — | — | — | 1980 |
|  | $|\eta^*|$ (0.1 rad/sec) ÷ $|\eta^*|$ (10 rad/sec) | — | — | — | — | 6.2 |
|  | $1 + 0.07 \times (\log_{10}(|\eta^*| @ (1\ \text{rad/sec})/\text{Pa} \cdot \text{sec}))^{3.4}$ | — | — | — | — | 7.4 |
| Evaluation | Oxidation induction time (min) | min | 25 | 20 | <1 | 3 (250° C.) |

TABLE 2-3

|  |  | Unit | Comp. Ex. 1 | Comp. Ex. 2 | Comp. Ex. 3 | Comp. Ex. 4 |
|---|---|---|---|---|---|---|
| Properties of acid-modified polyolefin particles | Amount of grafting (x) (converted to NMR) | wt % | 3.9 | 0.3 | 0.7 | 1.1 |
|  | [η] | dl/g | Unmeasurable | 2.5 | 0.95 | Unmeasurable |
|  | $\log_{10}([\eta]/\text{dl} \cdot \text{g}^{-1})$ | — | — | — | 0.40 | −0.02 | — |
|  | $\log_{10}([\eta]/\text{dl} \cdot \text{g}^{-1}) + 0.15x$ | — | — | — | 0.44 | 0.08 | — |
|  | Number of 0.05-0.2 μm holes in 1 μm square region (maximum numbers in three portions observed) | Holes | 11 | 0 | — | 12 |
|  |  | Holes | 10 | 0 | — | 11 |
|  |  | Holes | 10 | 0 | — | 8 |
|  | Average particle size | μm | 250 | 250 | — | 380 |
|  | t-BuOH | μg/g | 60 | — | — | 90 |
|  | IPA | μg/g | 2100 | — | — | 1700 |
|  | Benzene | μg/g | — | 15 | — | — |
|  | Gel content | wt % | 26 | 0.1 | 0 | 70 |
|  | $|\eta^*|$ (0.1 rad/sec) | Pa · sec | 770 | — | — | 18000 |
|  | $|\eta^*|$ (1 rad/sec) | Pa · sec | 400 | — | — | 4400 |
|  | $|\eta^*|$ (10 rad/sec) | Pa · sec | 210 | — | — | 1090 |
|  | $|\eta^*|$ (0.1 rad/sec) ÷ $|\eta^*|$ (10 rad/sec) | — | 3.7 | — | — | 16.5 |
|  | $1 + 0.07 \times (\log_{10}(|\eta^*| @ (1\ \text{rad/sec})/\text{Pa} \cdot \text{sec}))^{3.4}$ | — | 2.8 | — | — | 6.7 |
| Evaluation | Oxidation induction time (min) | min | 11 | 5 | — | 2 (250° C.) |

Example 8

A 1 L autoclave was loaded with 100 parts by weight of particles of a propylene homopolymer (melting point: 160° C.) having a MFR of 0.6 (g/10 min) and an average particle size of 380 μm. While performing stirring at room temperature in a nitrogen atmosphere, a solution of 5 parts by weight of allyl glycidyl ether in 17 parts by weight of toluene, and a solution of 2.6 parts by weight of t-butyl peroxyisopropyl monocarbonate (NOF CORPORATION, PERBUTYL I) as an organic peroxide in 3.5 parts by weight of toluene were added dropwise concurrently over a period of about 20 minutes. After the completion of the dropwise addition, stirring was continued for 30 minutes and thereafter the reaction was performed by heating the mixture in an oil bath at 125° C. for 5 hours. During the reaction, the autoclave was tightly closed. After the completion of the reaction, the system was cooled and the contents in the autoclave were withdrawn. Acetone was added to adjust the total volume to 1 L, and the mixture was stirred at room temperature for 10 minutes and was filtered. These operations were repeated 4 times in total, and the product was vacuum dried at 60° C. for 5 hours.

Three portions of the surface of the allyl glycidyl ether-grafted polypropylene particles obtained as described above were randomly selected and were observed in a 10 μm×13 μm field of view. As a result, the maximum number of holes having a size of 0.05 μm to 0.2 μm present in a 1 μm square region of the particle surface was 25. The maximum numbers of such holes in the respective three portions were 25, 20 and 18.

In the allyl glycidyl ether-grafted polypropylene particles, the amount of grafting by allyl glycidyl ether was 1.9 wt % and the average particle size was 380 μm.

The oxidation induction time of the allyl glycidyl ether-grafted polypropylene particles measured by the method described in (10) was 13 minutes.

Further, the content of t-butyl alcohol as an alcohol produced by the decomposition of the organic peroxide was measured by the headspace gas chromatography and was found to be 50 μg per 1 g of the allyl glycidyl ether-modified polypropylene particles, and the content of isopropyl alcohol was found to be 1550 μg.

The intrinsic viscosity [η] of the allyl glycidyl ether-grafted polypropylene particles was 0.95 dl/g.

Examples 9 to 13

Modified polypropylene particles were obtained in the same manner as in Example 8, except that conditions such as the types of the graft monomer and the organic peroxide, and the amounts of raw materials were changed as described in Tables 3-1 and 3-2 below. The results of the analysis of the modified polypropylene particles obtained are set forth in Table 4-1 and Table 4-2 below.

Example 14

A 1 L autoclave was loaded with 100 parts by weight of the same particles as used in Example 8, specifically, particles of a propylene homopolymer having a MFR of 0.6 (g/10 min) and an average particle size of 380 μm. While performing stirring in a nitrogen atmosphere, the particles were heated in an oil bath at 125° C. Under this condition, a solution of 15 parts by weight of allyl glycidyl ether in 35 parts by weight of toluene, and a solution of 12 parts by weight of t-butyl peroxyisopropyl monocarbonate (NOF CORPORATION, PERBUTYL I) as an organic peroxide in 3.5 parts by weight of toluene were added dropwise concurrently to the autoclave. The time required for the dropwise addition was 4 hours for the toluene solution of allyl glycidyl ether and 2 hours and 40 minutes for the toluene solution of t-butyl peroxyisopropyl monocarbonate. After the completion of the dropwise addition of the toluene solution of allyl glycidyl ether, heating and stirring were continued for 1 hour, and then the reaction was deemed to complete. During the reaction, the autoclave was tightly closed. After the completion of the reaction, the system was cooled and 280 parts by weight of acetone was added thereto. The autoclave was tightly closed again, and the system was heated in an oil bath at 100° C. for 1 hour while performing stirring. After the completion of the heating, the system was cooled and filtered. These operations were repeated 3 times in total, and the product was vacuum dried at 60° C. for 5 hours. The properties of the allyl glycidyl ether-modified polypropylene obtained are described in Table 4-2.

In Table 3-2, * in the row of reaction time means that the polypropylene homopolymer alone was fed to the reactor first and heated to 125° C., and thereafter the toluene solution of allyl glycidyl ether was dropped over a period of 4 hours concurrently with the toluene solution of the organic peroxide over a period of 2 hours and 40 minutes, and the reaction was further performed for 1 hour.

TABLE 3-1

| | | Unit | Ex. 8 | Ex. 9 | Ex. 10 | Ex. 11 |
|---|---|---|---|---|---|---|
| Raw materials | Polyolefin | Parts by weight | 100 | 100 | 100 | 100 |
| | Type | — | Propylene homopolymer (melting point 160° C., MFR = 0.6, average particle size 380 μm) | Propylene homopolymer (melting point 160° C., MFR = 0.6, average particle size 380 μm) | Propylene homopolymer (melting point 160° C., MFR = 0.6, average particle size 380 μm) | Propylene homopolymer (melting point 160° C., MFR = 5.4, average particle size 230 μm) |
| | Graft monomer | Parts by weight | 5 | 5 | 5 | 5 |
| | Type | | Allyl glycidyl ether | 2-Hydroxyethyl methacrylate | N,N-dimethylamino-methacrylamide | Allyl glycidyl ether |
| | Peroxide | Parts by weight | 2.6 | 2.3 | 2.6 | 2.6 |
| | Type | — | PBI | PBI | PBI | PBI |
| | Molecular weight of alkoxy radical moiety constituting the molecule | — | 73 and 103 | 73 and 103 | 73 and 103 | 73 and 103 |
| | Molecular weight of aromatic hydrocarbon radical moiety constituting the molecule | | — | — | — | — |

TABLE 3-1-continued

|  |  | Unit | Ex. 8 | Ex. 9 | Ex. 10 | Ex. 11 |
|---|---|---|---|---|---|---|
|  | (Number of moles of graft monomer) ÷ (Number of moles of peroxide) | — | 3 | 3 | 3 | 3 |
|  | Amount of toluene (to dissolve graft monomer) | Parts by weight | 17 | 17 | 17 | 17 |
|  | Amount of toluene (to dissolve peroxide) | Parts by weight | 3.5 | 3.5 | 3.5 | 3.5 |
| Grafting conditions | Reaction temperature | °C. | 125 | 125 | 125 | 125 |
|  | Reaction time | hr | 5 | 5 | 5 | 5 |

TABLE 3-2

|  |  | Unit | Ex. 12 | Ex. 13 | Ex. 14 |
|---|---|---|---|---|---|
| Raw materials | Polyolefin | Parts by weight | 100 | 100 | 100 |
|  | Type | — | Propylene homopolymer (melting point 160° C., MFR = 3.1, average particle size 1300 μm) | Propylene homopolymer (melting point 160° C., MFR = 0.6, average particle size 380 μm) | Propylene homopolymer (melting point 160° C., MFR = 0.6, average particle size 380 μm) |
|  | Graft monomer | Parts by weight | 5 | 5 | 15 |
|  | Type | — | Allyl glycidyl ether | Allyl glycidyl ether | Allyl glycidyl ether |
|  | Peroxide | Parts by weight | 2.6 | 2.6 | 11.3 |
|  | Type | — | PBI | PBZ | PBZ |
|  | Molecular weight of alkoxy radical moiety constituting the molecule | — | 73 and 103 | 73 | 73 |
|  | Molecular weight of aromatic hydrocarbon radical moiety constituting the molecule | — | — | 121 | 121 |
|  | (Number of moles of graft monomer) ÷ (Number of moles of peroxide) | — | 3 | 3 | 2.25 |
|  | Amount of toluene (to dissolve graft monomer) | Parts by weight | 17 | 17 | 35 |
|  | Amount of toluene (to dissolve peroxide) | Parts by weight | 3.5 | 3.5 | 3.5 |
| Grafting conditions | Reaction temperature | °C. | 125 | 130 | 130 |
|  | Reaction time | hr | 5 | 5 | 5* |

*The polypropylene homopolymer alone was fed to the reactor first and heated to 125° C., and thereafter the toluene solution of allyl glycidyl ether was dropped over a period of 4 hours concurrently with the toluene solution of the peroxide over a period of 2 hours and 40 minutes, and, after the completion of the dropwise addition of the toluene solution of allyl glycidyl ether, the reaction was further performed for 1 hour.

TABLE 4-1

|  |  | Unit | Ex. 8 | Ex. 9 | Ex. 10 | Ex. 11 |
|---|---|---|---|---|---|---|
| Properties of acid-modified polyolefin particles | Amount of grafting (x) | wt % | 1.9 | 2.0 | 2.4 | 1.8 |
|  | [η] | dl/g | 0.95 | 0.83 | 0.9 | 0.81 |
|  | $\log_{10}([\eta]/dl \cdot g^{-1})$ | — | −0.02 | −0.08 | −0.05 | −0.09 |
|  | $\log_{10}([\eta]/dl \cdot g^{-1}) + 0.15x$ | — | 0.26 | 0.22 | 0.31 | 0.18 |
|  | Number of 0.05-0.2 μm holes in 1 μm square region (maximum numbers in three portions observed) | Holes | 25 | 18 | 23 | 24 |
|  |  | Holes | 20 | 15 | 22 | 19 |
|  |  | Holes | 18 | 11 | 17 | 11 |
|  | Average particle size | μm | 380 | 380 | 380 | 260 |
|  | t-BuOH | μg/g | 50 | 45 | 47 | 40 |
|  | IPA | μg/g | 1550 | 1400 | 1450 | 1400 |
|  | Benzene | μg/g | — | — | — | — |

TABLE 4-1-continued

|  |  | Unit | Ex. 8 | Ex. 9 | Ex. 10 | Ex. 11 |
|---|---|---|---|---|---|---|
|  | Gel content | wt % | 0 | 0 | 0 | 0 |
|  | $\|\eta^*\|$ (0.1 rad/sec, 170° C.) | Pa · sec | — | — | — | — |
|  | $\|\eta^*\|$ (10 rad/sec, 170° C.) | Pa · sec | — | — | — | — |
|  | $\|\eta^*\|$ (0.1 rad/sec) ÷ $\|\eta^*\|$ (10 rad/sec) | — | — | — | — | — |
|  | $1 + 0.07 \times (\log_{10}(\|\eta^*\| @ (1\ rad/sec)/Pa \cdot sec))^{3.4}$ | — | — | — | — | — |
| Evaluation | Oxidation induction time (min) | min | 13 | 15 | 16 | 14 |

TABLE 4-2

|  |  | Unit | Ex. 12 | Ex. 13 | Ex. 14 |
|---|---|---|---|---|---|
| Properties of acid-modified polyolefin particles | Amount of grafting (x) | wt % | 1.9 | 1.8 | 3.7 |
|  | [η] | dl/g | 0.85 | 0.94 | 0.52 |
|  | $\log_{10}([\eta]/dl \cdot g^{-1})$ | — | −0.07 | −0.03 | −0.28 |
|  | $\log_{10}([\eta]/dl \cdot g^{-1}) + 0.15x$ | — | 0.21 | 0.24 | 0.27 |
|  | Number of 0.05-0.2 μm holes in 1 μm square region (maximum numbers in three portions observed) | Holes | 19 | 28 | 26 |
|  |  | Holes | 18 | 22 | 25 |
|  |  | Holes | 15 | 21 | 21 |
|  | Average particle size | μm | 1300 | 380 | 380 |
|  | t-BuOH | μg/g | 52 | 13 | 20 |
|  | IPA | μg/g | 1600 | — | — |
|  | Benzene | μg/g | — | 10 | 21 |
|  | Gel content | wt % | 0 | 0 | 0 |
|  | $\|\eta^*\|$ (0.1 rad/sec, 170° C.) | Pa · sec | — | — | — |
|  | $\|\eta^*\|$ (10 rad/sec, 170° C.) | Pa · sec | — | — | — |
|  | $\|\eta^*\|$ (0.1 rad/sec) ÷ $\|\eta^*\|$ (10 rad/sec) | — | — | — | — |
|  | $1 + 0.07 \times (\log_{10}(\|\eta^*\| @ (1\ rad/sec)/Pa \cdot sec))^{3.4}$ | — | — | — | — |
| Evaluation | Oxidation induction time (min) | min | 17 | 15 | 20 |

The invention claimed is:

1. Modified polyolefin particles obtained by grafting one monomer having an ethylenically unsaturated group and a polar functional group in the same molecule to a polymer including one, or two or more α-olefins selected from $C_{2-18}$ α-olefins and having a melting point of not less than 50° C. and less than 250° C., the modified polyolefin particles satisfying the following requirements (1) to (3):

(1) the amount of grafting x by the monomer having an ethylenically unsaturated group and a polar functional group in the same molecule is not less than 0.5 wt % and not more than 20 wt %;

(2) the amount of grafting x (wt %) by the monomer having an ethylenically unsaturated group and a polar functional group in the same molecule, and the intrinsic viscosity [η] (dl/g) measured in decalin at 135° C. satisfy the relation:

$$\log_{10}[\eta] \geq 0.1 - 0.15x;\text{ and}$$

(3) the modified polyolefin particles have a gel content of less than 1 wt %;

wherein the gel content is determined by placing approximately 0.3 g of the modified polyolefin particles into a 330 mesh metal gauge, adding 100 ml of xylene to the modified polyolefin particles in the gauge, heating the mixture under reflux for 2 hours, and calculating a ratio of the weight of undissolved components retained in the metal gauge to the weight of the whole of the modified polyolefin particles, and is obtained as the ratio, and wherein the polymer is selected from the group consisting of propylene homopolymer, propylene ethylene random copolymer, 4-methylpentene-1 homopolymer, random copolymer of 4-methylpentene-1 and propylene, random copolymer of 4-methylpentene-1 and hexene-1, random copolymer of 4-methylpentene-1 and decene-1, random copolymer of 4-methylpentene-1 and tetradecene, random copolymer of 4-methylpentene-1 and hexadecene-1, random copolymer of 4-methylpentene-1 and octadecene-1, and random copolymer of 4-methylpentene-1, hexadecene-1 and octadecene-1.

2. A method for producing the modified polyolefin particles described in claim 1, comprising:

impregnating particles of a polymer including one, or two or more α-olefins selected from $C_{2-18}$ α-olefins and having a melting point (Tm) of not less than 50° C. and less than 250° C. with a solution including:

(a) one monomer having an ethylenically unsaturated group and a polar functional group in the same molecule, (b) an organic peroxide and (c) an organic solvent, and reacting the particles with the solution at a temperature lower than (Tm−10)° C., the value of (number of moles of (a)÷number of moles of (b)) being 1 to 20, wherein the polymer is selected from the group consisting of propylene homopolymer, propylene ethylene random copolymer, 4-methylpentene-1 homopolymer, random copolymer of 4-methylpentene-1 and propylene, random copolymer of 4-methylpentene-1 and hexene-1, random copolymer of 4-methylpentene-1 and decene-1, random copolymer of 4-methylpentene-1 and tetradecene, random copolymer of 4-methylpentene-1 and hexadecene-1, random copolymer of 4-methylpentene-1 and octadecene-1, and random copolymer of 4-methylpentene-1, hexadecene-1 and octadecene-1.

3. The method according to claim 2, wherein the polymer described in claim 2 is a propylene homopolymer, and
the value of (number of moles of (a)÷number of moles of (b)) is 1.5 to 10.

4. The method according to claim 2, wherein the polymer described in claim 2 is a random copolymer whose propylene content is not less than 70 mol % and less than 99.9 mol %, and
the value of (number of moles of (a)÷number of moles of (b)) is 3 to 10.

5. The method according to claim 4, wherein the random copolymer is a random copolymer including at least one comonomer selected from ethylene and butene.

6. The method according to claim 2, wherein the polymer described in claim 2 is a random copolymer or homopolymer whose 4-methylpentene-1 content is not less than 80 mol %, and
the value of (number of moles of (a)÷number of moles of (b)) is 4 to 15.

7. The method according to claim 2, wherein the particles of the polymer have an average particle size of 0.2 mm to 2.5 mm.

8. The method according to claim 2, wherein the organic peroxide is an organic peroxide including an aliphatic alkoxy radical moiety with 150 or less molecular weight as a constituent moiety of the peroxide.

9. The method according to claim 8, wherein the molecular weight of the aliphatic alkoxy radical moiety is not more than 110.

10. The method according to claim 2, wherein the organic peroxide is an organic peroxide including an aliphatic alkoxy radical moiety with 150 or less molecular weight and an aromatic ring-containing compound radical moiety with 250 or less molecular weight as constituent moieties of the peroxide.

11. The method according to claim 2, wherein the particles of the polymer have an average particle size of 0.2 mm to 10 mm.

12. The modified polyolefin particles according to claim 1, having an average particle size of 0.2 mm to 2.5 mm.

13. The modified polyolefin particles according to claim 12, wherein the surface of the particles, when observed on a scanning electron microscope with 10000 times magnification, has a 1 μm×1 μm region containing 5 to 400 holes having a size of 0.05 μm to 0.2 μm.

14. The modified polyolefin particles according to claim 13, wherein when the surface of the particles is observed on a scanning electron microscope with 10000 times magnification with respect to randomly selected three portions of the surface in a 13 μm×10 μm field of view, one, or two or more of the three portions of the particle surface have a 1 μm×1 μm region containing 10 to 400 holes having a size of 0.05 μm to 0.2 μm.

15. The modified polyolefin particles according to claim 1, wherein the gel content is not less than 0.00003 wt %.

16. The modified polyolefin particles according to claim 15, wherein the polymer is selected from the group consisting of propylene ethylene random copolymer,
4-methylpentene-1 homopolymer, random copolymer of 4-methylpentene-1 and propylene, random copolymer of 4-methylpentene-1 and hexene-1, random copolymer of 4-methylpentene-1 and decene-1, random copolymer of 4-methylpentene-1 and tetradecene, random copolymer of 4-methylpentene-1 and hexadecene-1, random copolymer of 4-methylpentene-1 and octadecene-1, and random copolymer of 4-methylpentene-1, hexadecene-1 and octadecene-1, and the gel content is not less than 0.00003 wt %.

17. The modified polyolefin particles according claim 1, wherein the modified polyolefin particles, when heated at 190° C. for 30 minutes, generate a gas containing an aliphatic alcohol with 150 or less molecular weight in an amount of not less than 1 and not more than 10000 μg per 1 g of the modified polyolefin particles as measured by headspace gas chromatography.

18. The modified polyolefin particles according to claim 17, wherein in the gas generated by heating the modified polyolefin particles at 190° C. for 30 minutes, the content, measured by headspace gas chromatography, of an aliphatic alcohol with 110 or less molecular weight is not less than 1 μg and not more than 10000 μg per 1 g of the modified polyolefin particles.

19. The modified polyolefin particles according to claim 1, wherein the modified polyolefin particles, when heated at 190° C. for 30 minutes, generate a gas containing an aliphatic alcohol with 150 or less molecular weight and an aromatic ring-containing compound with 250 or less molecular weight each in an amount of not less than 1 μg and not more than 10000 μg per 1 g of the modified polyolefin particles as measured by headspace gas chromatography.

20. The modified polyolefin particles according to claim 1, wherein the grafting is performed by graft reacting the monomer having an ethylenically unsaturated group and a polar functional group in the same molecule to the polyolefin resin in the presence of a radical initiator, and
the radical initiator is an organic peroxide including an aliphatic alkoxy radical moiety with 150 or less molecular weight as a constituent moiety of the peroxide.

21. The modified polyolefin particles according to claim 19, wherein the molecular weight of the aliphatic alkoxy radical moiety is not more than 110.

22. The modified polyolefin particles according to claim 1, wherein the grafting is performed by graft reacting the monomer having an ethylenically unsaturated group and a polar functional group in the same molecule to the polyolefin resin in the presence of a radical initiator, and
the radical initiator is an organic peroxide including an aliphatic alkoxy radical moiety with 150 or less molecular weight and an aromatic ring-containing compound radical moiety with 250 or less molecular weight as constituent moieties of the peroxide.

23. The modified polyolefin particles according to claim 1, wherein the monomer is maleic anhydride.

24. The modified polyolefin particles according to claim 1, having an average particle size of 0.2 mm to 10 mm.

* * * * *